United States Patent
Mazo et al.

(10) Patent No.: US 11,261,136 B2
(45) Date of Patent: Mar. 1, 2022

(54) TRIARYLMETHANE COMPOUNDS FOR CONTROLLING ENZYME-INDUCED UREA DECOMPOSITION

(71) Applicant: Verdesian Life Sciences U.S., LLC, Cary, NC (US)

(72) Inventors: Jacob Mazo, Des Plaines, IL (US); Grigory Mazo, Des Plaines, IL (US)

(73) Assignee: Verdesian Life Sciences U.S., LLC, Cary, NC (US)

(*) Notice: Subject to any disclaimer, the term of this patent is extended or adjusted under 35 U.S.C. 154(b) by 185 days.

(21) Appl. No.: 16/498,545

(22) PCT Filed: Mar. 28, 2018

(86) PCT No.: PCT/US2018/024935
§ 371 (c)(1),
(2) Date: Sep. 27, 2019

(87) PCT Pub. No.: WO2018/183562
PCT Pub. Date: Oct. 4, 2018

(65) Prior Publication Data
US 2020/0031730 A1    Jan. 30, 2020

Related U.S. Application Data

(60) Provisional application No. 62/477,547, filed on Mar. 28, 2017.

(51) Int. Cl.
*C05G 3/90* (2020.01)
*C05C 9/00* (2006.01)
(Continued)

(52) U.S. Cl.
CPC .......... *C05G 3/90* (2020.02); *C05C 9/00* (2013.01); *C05G 5/23* (2020.02); *C05G 5/30* (2020.02);
(Continued)

(58) Field of Classification Search
None
See application file for complete search history.

(56) References Cited

U.S. PATENT DOCUMENTS 2,616,786 A * 11/1952 Whetstone ............. A45C 13/03
423/266
2,616,787 A * 11/1952 Whetstone ............. C06B 23/00
423/268
(Continued)

FOREIGN PATENT DOCUMENTS

WO    2015031521 A1    3/2015

OTHER PUBLICATIONS

Fizhenko, N. V., "Influence of basic triphenylmethane dyes on activity of some enzymes", Voprosy Tsitol. i Protistol., Akad. Nauk S.S.S.R., Inst. Tsitol., Sbornik Rabot, 1960, pp. 147-155 See abstract. (Document is in Russian language; English abstract attached).

(Continued)

*Primary Examiner* — Wayne A Langel
(74) *Attorney, Agent, or Firm* — Katten Munchin Rosenman LLP

(57) ABSTRACT

Provided herein are compositions and methods for controlling enzyme-induced urea decomposition attendant to the application of solid or liquid urea-containing fertilizers to soils. More particularly, the subject matter disclosed herein is concerned with selected triarylmethane compounds as urease inhibitors and their use, either alone or in combination with tetrapolymer synergists. Further, the disclosed compositions have good storage stability, long-lived activity in soil, and avoid the toxicity issues common with present-day urease inhibitors used in agriculture.

20 Claims, 6 Drawing Sheets

(51) Int. Cl.
  *C05G 5/30*   (2020.01)
  *C05G 5/23*   (2020.01)
  *C09K 15/12*  (2006.01)
  *C09K 15/16*  (2006.01)
  *C09K 15/18*  (2006.01)

(52) U.S. Cl.
  CPC .............. *C09K 15/12* (2013.01); *C09K 15/16* (2013.01); *C09K 15/18* (2013.01)

(56) References Cited

U.S. PATENT DOCUMENTS

| | | |
|---|---|---|
| 3,547,614 A | 12/1970 | Peterson et al. |
| 5,387,745 A * | 2/1995 | Brendle ................ A01N 25/00 504/206 |
| 5,435,821 A | 7/1995 | Duvdevani et al. |
| 2005/0187323 A1* | 8/2005 | Harz ........................ C05G 3/00 524/358 |
| 2015/0344380 A1* | 12/2015 | Fanning .................. C05B 17/00 504/206 |
| 2016/0185678 A1* | 6/2016 | Sanders ................ C08F 222/10 71/28 |

OTHER PUBLICATIONS

Fizhenko, N. V. et al., "Character of enzyme inhibition by basic dyes", Tsitologiya, 1967, vol. 9, No. 9, pp. 1144-1150 See abstract. (Document is in Russian language; English abstract attached).

International Search Report for PCTUS2018024935 dated Jul. 31, 2018.

Extended European Search Report for EP Application No. 18774644. 1, dated Oct. 27, 2020.

Caplus, Chemical Abstract Compound, STN, RN 852371-77-8 (Entered STN Jun. 16, 2005), RN 115-41-3 (Entered STN Nov. 16, 1984, Nov. 16, 1984 (Nov. 16, 1984), XPO55740929, [retrieved on Oct. 16, 2020].

Lon-Lon et al., "Triphenylmethane Dyes as Inhibitors of Reverse Transcriptase, Ribonucleic acid Polymerase, and Protein Synthesis. Structure-Activity Relations", Journal of Medicinal Chemistry, vol. 18 (1), Jan. 1, 1975, p. 117-120, XP055544806, Germany.

* cited by examiner

TRIARYLMETHANE COMPOUNDS FOR CONTROLLING ENZYME-INDUCED UREA DECOMPOSITION

CROSS-REFERENCE TO RELATED APPLICATIONS

This application is a U.S. National Stage entry of International Application No. PCT/US2018/024935 filed Mar. 28, 2018, which claims the benefit of U.S. Provisional Patent Application Ser. 62/477,547 filed Mar. 28, 2017, each of which is herein incorporated by reference in its entirety for all purposes.

BACKGROUND OF THE INVENTION

Field of the Invention

The present invention is directed to compositions and methods for controlling enzyme-induced urea decomposition attendant to the application of solid or liquid urea-containing fertilizers to soils. More particularly, it is concerned with selected triarylmethane compounds found to be highly effective urease inhibitors, either alone or in combination with tetrapolymer synergists. The compositions of the invention have good storage stability, long-lived activity in soil, and avoid the toxicity issues common with present-day urease inhibitors used in agriculture.

Background

Urea is the most widely used form of nitrogenous fertilizer, and is formulated as dry granules, prills, or as fluids made up of urea alone or mixed with ammonium nitrate as UAN. Urea is also present in animal manures. These forms of urea have a significant disadvantage in that they undergo rapid decomposition and generate ammonia gas when applied to soil. This is due to the presence of urease enzyme in soils, which reacts with urea to produce ammonium bicarbonate and ammonia. This general set of processes is known in the art as volatilization. Volatilization results in decreased efficiency of nitrogen fertilizer use, lower yields, plant symptoms of nitrogen deficiency, undesirable odors, and potentially harmful ammonia gas concentrations.

In response to these problems, considerable research has been done towards the development of urease enzyme inhibitors. For example, catechol, benzoquinone, and related compounds have been shown to be effective urease inhibitors. For example, an article by J. H. Quastel, entitled, "CXLIX. The Action of Polyhydric Phenols on Urease; the Influence of Thiol Compounds" (Biochem J. 1933:27(4): 1116-1122), described experiments confirming that these compounds were effective urase inhibitors at concentrations of about 1 ppm by weight in solution. See also, "CC. The Action of Dyestuffs on Enzymes. III. Urease" (Biochem J. 1932:26(5):1685-1696). However, for reasons of cost, safety, convenience, stability, and ease of use, these compounds are not currently used for urease inhibition on a commercial scale. Moreover, subsequent research has determined that the urease-control effects of these small molecules is essentially short term, on the order of 3-14 days.

A number of phosphoramide compounds are known to act as effective urease inhibitors. One such compound, N-(n-butyl) thiophosphoric triamide (NBPT), has achieved substantial commercial use in products such as the Agrotain® family of inhibitors.

However, NBPT products require storage at temperatures that do not exceed 36-38° C., which can be problematical for some distributors and users. Moreover, these products may be subjected to temperature conditions during transport or storage, unbeknownst to the ultimate user; in such cases, the products may be substantially below label strengths in terms of active ingredients. Research has also shown that up to 40% of the NBPT content of commercial fertilizer products including NBPT may be lost after storage at 25° C. for three months and, after six months, over 99% of the NBPT content was lost.

Another very important problem related to NBPT urease inhibition is that while it is effective for inhibiting soil-borne urease, it also inhibits urease in plants causing urea to accumulate in plant tissues. This phenomenon is harmful to plants and can result in severe tissue necrosis. NBPT can also negatively affect modes of urea uptake and assimilation by plant roots, corn in particular. As such, even when NBPT is successfully used for soil-borne urease inhibition, this may cause a significant decrease in plant yield. In some cases, NBPT inhibitors are not cost effective, in that the expense of purchasing and applying the inhibitors does not result in sufficiently increased yields to justify the usage. Hendrickson teaches (J. Prod. Agric., 5:131-137 (1992)) that on average, when used with UAN, NBPT gives about 1.6 bushels/acre average improvement in yield (Hendrickson FIG. 3), with about 40% of trials resulting in yield losses (this being result of 87 trials and 487 comparisons).

A number of polymeric materials can serve as urease inhibitors. For example, as disclosed in US Patent Publication No. 2008/0173053, carboxylate polymers in partial salt form, and especially maleic-itaconic copolymer salts, may be employed as useful inhibitors. It is believed that these polymers interact with nickel atoms urease enzyme to generate an inhibitory response.

Background references include: U.S. Pat. Nos. 9,249,102, 8,980,893, 8,969,554, 8,951,636, 8,946,270, 8,864,867, 8,841,100, 8,642,636, 8,618,126, 8,575,067, 8,568,505, 8,461,176, 8,426,460, 8,361,184, 8,198,214, 8,197,572, 8,110,017, 5,489,370, and 5,405,509; and US Patent Publications Nos. 2016/0045841, 2015/0366186, 2015/0359221, 2015/0319945, 2015/0203457, 2015/0183785, 2015/0174255, 2015/0158776, 2015/0126/23, 2014/0349375, 2014/0315794, 2014/0179746, 2014/0142114, 2014/0076012, 2013/0111960, 2013/0108872, 2013/0102468, 2013/0065967, 2012/0220667, 2012/0198899, 2011/0269920, 2011/0269919, 2011/0245157, 2011/0226028, 2011/0152312, 2011/0136210, 2011/0105623, 2010/0144859, 2010/0125089, 2009/0229331, 2007/0066487, and 2006/0154824.

Other references include: U.S. Pat. Nos. 8,241,387, 7,666, 241, 7,494,525, 6,489,438, 5,190,797, 4,832,728, 4,789,391, 4,756,738, 4,752,317, 3,565,599, and 2,689,173; US Patent Publications No. 2002/0042346; Foreign Publication Nos. WO 1987006575, WO 1989003811, WO2015031521, WO2015179552; and non-patent literature references Ambrose et al., "Inhibition of Urease by Sulfur Compounds," *JACS,* 1950, Vol. 72, pp 317-321; Lukowska et al., "Preparation of Sulfonated Polysulfone Membrane for Enzymes Immobilisation," *Biocybernetics and Biomedical Engineering,* 2012, Vol. 32, pp 77-86; and Upadhyay, "*Urease Inhibitors: A Review,*" *Indian Journal of Biotechnology,* 2012, Vol. 11, pp 381-388.

PCT Publication WO 89/03811 describes sulfonated polymer coatings used for the preparation of controlled release fertilizer products, such as urea and ammonium sulfate fertilizers. One goal is to reduce nitrogen losses by controlling the release of nitrogen from the coated fertilizers. In order to obtain such controlled or slow-release fertilizer products, it is essential that the applied polymers be essentially water insoluble. As set forth on p. 12, ll. 15-29 of the '811 reference, the controlled release coatings include a water insoluble sulfonated polymer dissolved in an organic solvent system. The polymers include a maximum of about 200 milliequivalents (meq.) of pendant sulfonate groups per 100 g of polymer. This translates to a maximum of 25 mole % of pendant sulfonate groups. Usable polymers in accordance with the '811 reference may also include substantial amounts of hydrocarbon (aliphatic and/or aromatic) repeat units, such as butyl, ethylene, propylene, isobutylene, and vinyl repeat units (p. 13, ll. 1-20 and pp. 15-16).

Despite these research efforts, there still remains a significant need in the art for improved methods and compositions for controlling enzyme-induced urea decomposition.

SUMMARY OF THE INVENTION

The present invention overcomes the problems outlined above and provides methods and compositions which are highly effective in the control of enzyme-induced urea decomposition. Generally speaking, the compositions include triarylmethane compounds having a central carbon atom bonded with three individual six-membered aryl groups having specific substituents bonded at various positions around the aryl groups. Particular examples include catechol-like compounds (e.g., catechol violet and related compounds), and compounds where at least one of the aryl groups includes at least one amine, with optional alkylation of the amine(s), such as polymethylated pararosanilines. Some of the compounds are dye materials having the added advantage of serving as pH-dependent colorants for the compositions.

Additionally, certain tetrapolymers, when used with the triarylmethane compounds, provide a synergistic improvement in urease inhibition. Such tetrapolymers are polyanionic in character, and also include aliphatic sulfonate groups bonded to the polymer backbone, at a level of at least about 1 mol percent. Advantageously, the polymeric synergists include maleic, itaconic, and sulfonate repeat units

DETAILED DESCRIPTION

The Inhibitor Compounds

Figure 1:
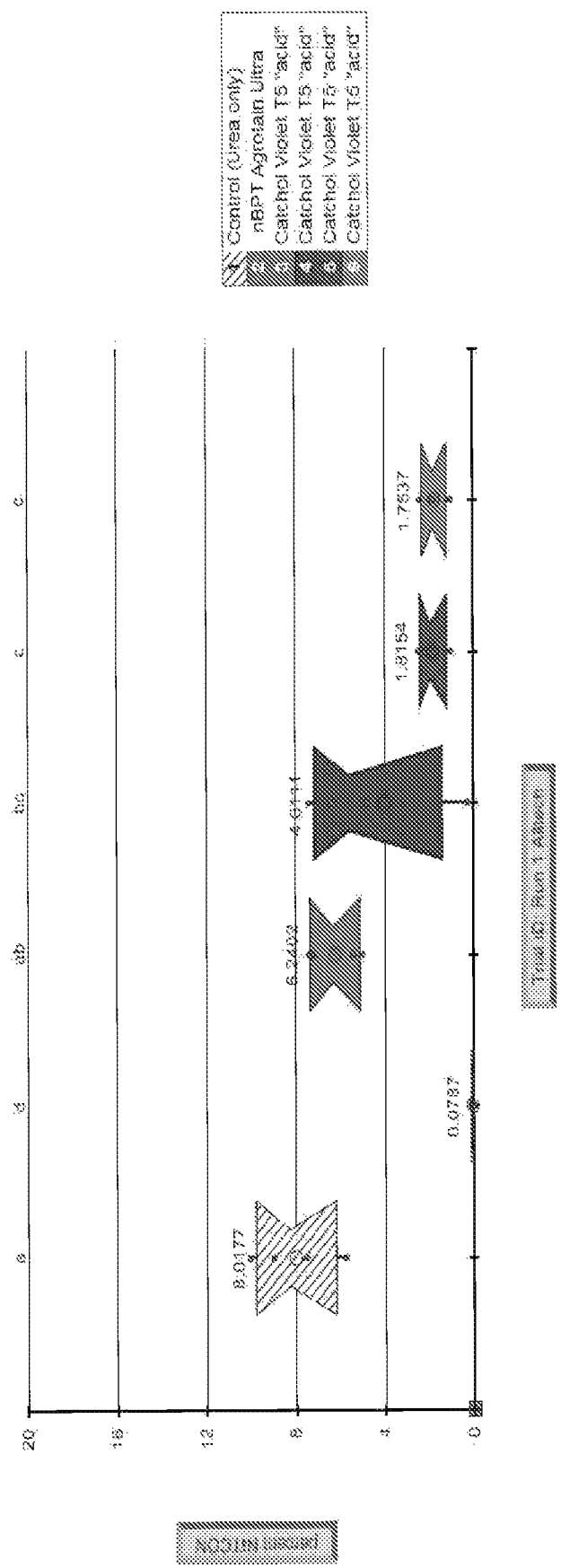
FIG. 1 shows the 3-day volatility results of solutions in the 50:50 water:urea solvent, with three different ratios of Catechol Violet to the polymer, T5 Acid.

The compounds of the invention found to be particularly useful for controlling enzyme-induced urea decomposition are broadly triarylmethane compounds having specific substituents, designated as Groups I and II below.

All of the compounds have the general components of triarylmethanes, in particular a central carbon atom C bonded with three individual aryl groups X, Y, and Z, where (1) the aryl group X has the structure

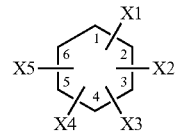

where the carbon atom C is bonded at position 1, and X1-X5, inclusive, are H or substituents bonded at any of the positions 2-6; (2) the aryl group Y has the structure

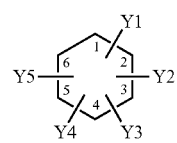

where the carbon atom C is bonded at position 1, and Y1-Y5, inclusive, are H or substituents bonded at any of the positions 2-6; (3) the aryl group Z has the structure

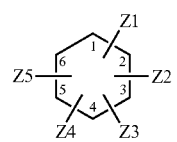

where the carbon atom C is bonded at position 1, and Z1-Z5, inclusive, are H or substituents bonded at any of the positions 2-6.

The Group 1 compounds are defined by selected substituents, namely:

(A) at least one of X2-X6, inclusive, Y2-Y6, inclusive, and/or Z2-Z6, inclusive, is a sulfonate group bonded at any of the positions 2-6 of the corresponding aryl ring(s) X, Y, and/or Z, said at least one sulfonate group having the structure (i)

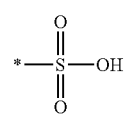

or the structure (ii)

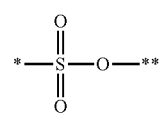

where "*" represents the bonding of the sulfate group to the corresponding X, Y, or Z aryl group, and "**" represents the bonding of the sulfate group to another atom of the compound (usually the central carbon atom C;

(B) at least two of X1-X5, inclusive, Y1-Y5, inclusive, and/or Z1-Z5, inclusive, are substituents having an oxygen atom bonded to the corresponding aryl ring(s) X, Y, and/or Z, and selected from the group consisting of 0 and OH, with the proviso that no more than two such oxygen atoms are present in any of the X, Y, and Z aryl groups;

(C) X1-X5, inclusive, Y1-Y5, inclusive, and/or Z1-Z5, inclusive, which are not the substituents of paragraphs (A) and (B), are all H.

In certain embodiments, the Group I compounds have only one sulfonate group, which is preferentially attached to the corresponding aryl group X, Y, or Z at a position which is ortho to the bond connecting the aryl group and the central carbon C. Furthermore, it is preferred that the two non-sulfonated aromatic rings each possess at least two substituents independently selected from the group consisting of 0 (oxygen atom) and OH (hydroxyl). In still further preferred forms, one of the non-sulfonated aryl groups has two OH groups (most preferably positioned ortho to each other), whereas the other non-sulfonated aryl group has one oxygen atom substituent and one hydroxyl substituent. Finally, it is preferred that the central carbon atom C be the only carbon atom in the compound that is not part of one of the aryl rings. A paradigm compound of Group I is 3,3',4-trihydroxysuchsone-2"-sulfonic acid (pyrocatechol violet, also referred to herein as catechol violet):

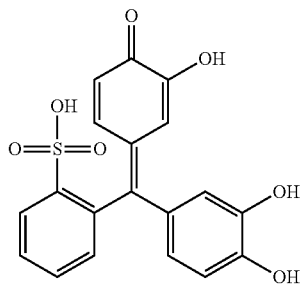 [SMILES: O=C1C=C/C(=C(/c2ccc(O)c(O)c2)c2ccccc2S(=O)(=O)O)C=C1O]

The Group II compounds are characterized by different substituents, namely:

(D) at least one nitrogen substituent is bonded to at least one of the aryl groups X, Y, and/or Z, where the nitrogen substituent is selected from the group consisting of

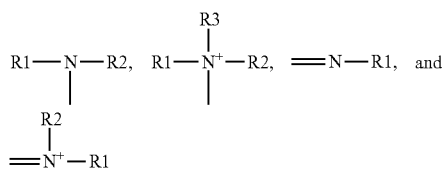

where R1, R2, and R3 are independently selected from the group consisting of H, CH$_3$, and C$_2$H$_5$;

(E) the remainder of the substituents X2-X6, Y2-Y6, and Z2-Z6 are independently selected from the group consisting of H, CH$_3$, and C$_2$H$_5$.

In certain embodiments, only one of the nitrogen substituents is attached to any one of the aryl groups X, Y, and Z; and one or two of the aryl groups has a substituent

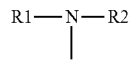

and another of the aryl groups has a substituent =N$^+$—R1. Still more preferably, in these embodiments, R1 and R2 are all H. Further, the nitrogen substituents are preferably positioned para relative to the bond between the central carbon atom C and the corresponding aryl group X, Y, and Z. Where one or more of the substituents are quaternary, charge-balancing anions X' are present, such as Cl, Br, or I.

In some embodiments, R1, R2, and R3 are independently alkyl.

A typical compound of Group II is methyl violet 6B where X' is Cl$^-$:

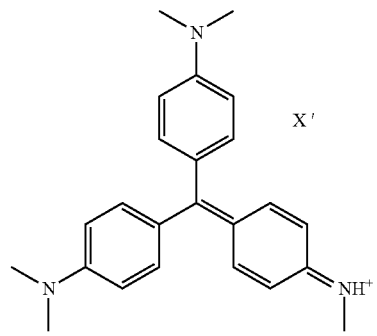

In most instances, the Group I and Group II compounds will be of the general structure

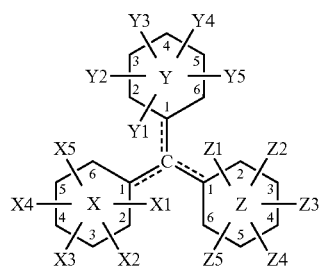

where one of the bonds between the central carbon atom C and one of the aryl rings X, Y, or Z is a double bond, and remaining two bonds are single bonds. The double bond may exist between the carbon atom C and any one of the aryl rings X, Y, or Z, as indicated by the dotted bond lines in the above structure. In the case of Group I compounds, the at least one sulfonate group will usually, but not necessarily, have the structure (4)(i).

The Group I and Group II compounds can be synthesized by any suitable method known in the art. For example, the Group I compounds may be prepared by reacting catechols with sulfobenzoic anhydrides at elevated temperatures. The pararosaniline and methylated pararosaniline compounds of Group II may be prepared by condensation of aniline and para-aminobenzaldehyde, followed by methylation of amines as necessary.

As disclosed herein in some embodiments is a composition comprising a triarylmethane compound and a synergist, wherein the triarylmethane compound comprises a central carbon atom C bonded with three individual aryl groups X, Y, and Z, where:

(1) the aryl group X has the structure

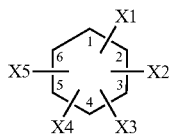

where the carbon atom C is bonded at position 1, and X1-X5, inclusive, are H or substituents bonded at any of the positions 2-6;

(2) the aryl group Y has the structure

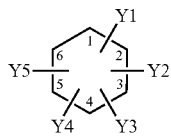

where the carbon atom C is bonded at position 1, and Y1-Y5, inclusive, are H or substituents bonded at any of the positions 2-6;

(3) the aryl group Z has the structure

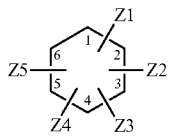

where the carbon atom C is bonded at position 1, and Z1-Z5, inclusive, are H or substituents bonded at any of the positions 2-6, where the selected substituents X2-X6, inclusive, Y2-Y6, inclusive, and Z2-Z6, inclusive belong to group I or group II, where the group I substituents are:

(A) at least one of X2-X6, inclusive, Y2-Y6, inclusive, and/or Z2-Z6, inclusive, is a sulfonate group bonded at any of the positions 2-6 of the corresponding aryl ring(s) X, Y, and/or Z, the at least one sulfonate group comprising the structure (i)

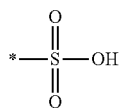 [SMILES: *S(=O)(=O)O]

or the structure (ii)

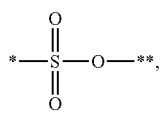

where "*" represents the bonding of the sulfate group to the corresponding X, Y, or Z aryl group, and "**" represents the bonding of the sulfate group to another atom of the compound;

(B) at least two of X1-X5, inclusive, Y1-Y5, inclusive, and/or Z1-Z5, inclusive, are substituents comprising an oxygen atom bonded to the corresponding aryl ring(s) X, Y, and/or Z, and selected from the group consisting of O and OH, with the proviso that no more than two such oxygen atoms are present in any of the X, Y, and Z aryl groups;

(C) X1-X5, inclusive, Y1-Y5, inclusive, and/or Z1-Z5, inclusive, which are not the substituents of paragraphs (A) and (B), are all H, the group II constituents are:

(D) at least one nitrogen substituent is bonded to at least one of the aryl groups X, Y, and/or Z, where the nitrogen substituent is selected from the group consisting of

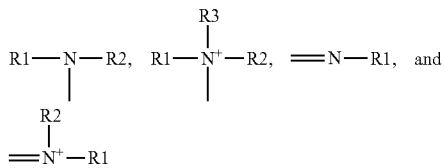

where R1, R2, and R3 are independently selected from the group consisting of H, $CH_3$, and $C_2H_5$, (E) the remainder of the substituents X2-X6, Y2-Y6, and Z2-Z6 are independently selected from the group consisting of H, $CH_3$, and $C_2H_5$, the synergist comprising a polyanionic polymer comprising sulfonate repeat units.

As in any embodiment above, a composition wherein the Group I triarylmethane compound has a single sulfonate group.

As in any embodiment above, a composition wherein the sulfonate group is bonded to the X, Y, or Z aryl ring at a position ortho to the bond between the corresponding ring and the central carbon atom C.

As in any embodiment above, a composition wherein the central carbon atom C is the only carbon atom of the compound not a part of an aryl ring.

As in any embodiment above, a composition wherein the Group I compounds have at least two of the aryl rings X, Y, and Z with two substituents each which have an oxygen atom bonded to the corresponding aryl rings.

As in any embodiment above, a composition wherein at least one aryl ring of the two aryl rings has two hydroxyl substituents.

As in any embodiment above, a composition wherein each of the two aryl rings has two hydroxyl substituents.

As in any embodiment above, a composition wherein each of the two hydroxyl substituents on each of the two aryl rings are positioned ortho to each other.

As in any embodiment above, a composition wherein at least one aryl ring of the two aryl rings has one hydroxyl substituent and one oxygen substituent.

As in any embodiment above, a composition wherein each of the two aryl rings has one hydroxyl substituent and one oxygen substituent.

As in any embodiment above, a composition wherein the compound is 3,3',4-trihydroxysuchsone-2"-sulfonic acid.

As in any embodiment above, a composition wherein the triarylmethane compound has the structure

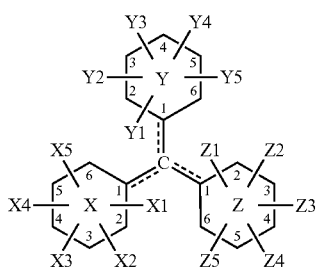

where one of the bonds between the central carbon atom C and one of the aryl rings X, Y, or Z is a double bond, and remaining two bonds are single bonds, the at least one sulfonate group comprising the structure (4)(i) when the compound is a Group I compound.

As in any embodiment above, a composition wherein the at least one sulfonate group has the structure (4)(ii), with the "**" representing the bonding of the S—O oxygen to the central carbon atom C.

As in any embodiment above, a composition further including a urea-containing fertilizer.

As in any embodiment above, a composition wherein the tetrapolymer is present at a level sufficient to increase the control of enzyme-induced urea decomposition, as compared with use of the compound alone.

As in any embodiment above, a composition wherein the urea-containing fertilizer is a liquid fertilizer, the compound being mixed with the liquid fertilizer.

As in any embodiment above, a composition wherein the urea-containing fertilizer is a solid fertilizer, the compound being coated with, mixed with, impregnated with, or in contact with the fertilizer.

As in any embodiment above, a composition wherein the triarylmethane compound is a polymethylated pararosaniline.

As in any embodiment above, a composition wherein the compound is methyl violet.

As in any embodiment above, a composition wherein the weight ratio of synergist to triarylmethane compound is from about 1:99 to about 99:1. In further embodiments, a composition wherein the weight ratio of synergist to triarylmethane compound is from about 1:4 to about 4:1.

As in any embodiment above, a composition wherein the color of the composition is pH-dependent.

As in any embodiment above, a composition wherein the composition decreases urease activity by at least about 50%. In further embodiments, a composition wherein the composition decreases urease activity by at least about 75%.

As in any embodiment above, a composition wherein the composition further comprises a solvent or carrier. In a further embodiment, the solvent comprises water.

As in any embodiment above, a composition wherein the composition further comprises poly(styrene sulfonate). In some embodiments, the poly(styrene sulfonate) is present in concentrations of from about 0.01% to about 2% (or about 0.01%, 0.05%, 0.1%, 0.2%, 0.25%, 0.3%, 0.4%, 0.5%, 0.6%, 0.7%, 0.8%, 0.9%, 1.0%, 1.1%, 1.2%, 1.3%, 1.4%, 1.5%, 1.6%, 1.7%, 1.8%, 1.9%, or 2.0%, by volume in solution (i.e., v/v), or by weight (i.e., w/w), or ranges including and/or spanning the aforementioned values. For example, in some embodiments the concentration is in a range from about 0.01% to about 0.1%, from about 0.1% to about 0.25%, from about 0.25% to about 0.50%, from about 0.5% to about 1.0%, or from about 1.0% to about 2.0%.

Poly(styrene sulfonate) (also referred to herein as JG polymer) is fully described in WO 2017/195173, which is incorporated by reference herein in its entirety.

As disclosed herein in some embodiments is a fertilizer product comprising a urea-containing fertilizer in contact with a triarylmethane compound comprising a central carbon atom C bonded with three individual aryl groups X, Y, and Z, where:

(1) the aryl group X has the structure

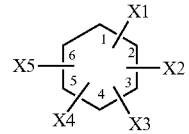

where the carbon atom C is bonded at position 1, and X1-X5, inclusive, are H or substituents bonded at any of the positions 2-6;

(2) the aryl group Y has the structure

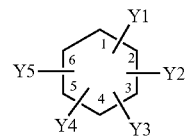

where the carbon atom C is bonded at position 1, and Y1-Y5, inclusive, are H or substituents bonded at any of the positions 2-6;

(3) the aryl group Z has the structure

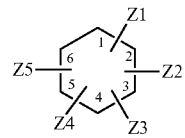

where the carbon atom C is bonded at position 1, and Z1-Z5, inclusive, are H or substituents bonded at any of the positions 2-6, where the selected substituents X2-X6, inclusive, Y2-Y6, inclusive, and Z2-Z6, inclusive belong to group I or group II, where the group I substituents are:
(A) at least one of X2-X6, inclusive, Y2-Y6, inclusive, and/or Z2-Z6, inclusive, is a sulfonate group bonded at any of the positions 2-6 of the corresponding aryl ring(s) X, Y, and/or Z, the at least one sulfonate group comprising the structure (i)

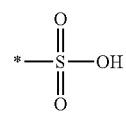

or the structure (ii)

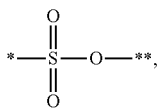

where "*" represents the bonding of the sulfate group to the corresponding X, Y, or Z aryl group, and "**" represents the bonding of the sulfate group to another atom of the compound;

(B) at least two of X1-X5, inclusive, Y1-Y5, inclusive, and/or Z1-Z5, inclusive, are substituents comprising an oxygen atom bonded to the corresponding aryl ring(s) X, Y, and/or Z, and selected from the group consisting of O and OH, with the proviso that no more than two such oxygen atoms are present in any of the X, Y, and Z aryl groups;

(C) X1-X5, inclusive, Y1-Y5, inclusive, and/or Z1-Z5, inclusive, which are not the substituents of paragraphs (A) and (B), are all H, the group II constituents are:

(D) at least one nitrogen substituent is bonded to at least one of the aryl groups X, Y, and/or Z, where the nitrogen substituent is selected from the group consisting of

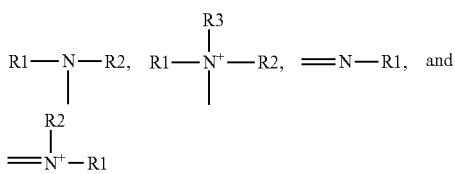

where R1, R2, and R3 are independently selected from the group consisting of H, CH$_3$, and C$_2$H$_5$, (E) the remainder of the substituents X2-X6, Y2-Y6, and Z2-Z6 are independently selected from the group consisting of H, CH$_3$, and C$_2$H$_5$.

As in any embodiment above, a fertilizer product wherein the Group I triarylmethane compound has a single sulfonate group.

As in any embodiment above, a fertilizer product wherein the sulfonate group is bonded to the X, Y, or Z aryl ring at a position ortho to the bond between the corresponding ring and the central carbon atom C.

As in any embodiment above, a fertilizer product wherein the central carbon atom C is the only carbon atom of the compound not a part of an aryl ring.

As in any embodiment above, a fertilizer product wherein the Group I compounds have at least two of the aryl rings X, Y, and Z with two substituents each which have an oxygen atom bonded to the corresponding aryl rings.

As in any embodiment above, a fertilizer product wherein at least one aryl ring of the two aryl rings has two hydroxyl substituents.

As in any embodiment above, a fertilizer product wherein each of the two aryl rings has two hydroxyl substituents.

As in any embodiment above, a fertilizer product wherein each of the two hydroxyl substituents on each of the two aryl rings is positioned ortho to each other.

As in any embodiment above, a fertilizer product wherein at least one aryl ring of the two aryl rings has one hydroxyl substituent and one oxygen substituent.

As in any embodiment above, a fertilizer product wherein each of the two aryl rings has one hydroxyl substituent and one oxygen substituent.

As in any embodiment above, a fertilizer product wherein the compound is 3,3',4-trihydroxysuchsone-2"-sulfonic acid.

As in any embodiment above, a fertilizer product wherein the triarylmethane compound is of the structure

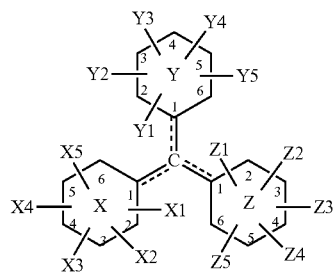

where one of the bonds between the central carbon atom C and one of the aryl rings X, Y, or Z is a double bond, and remaining two bonds are single bonds, the at least one sulfonate group comprising the structure (4)(i) when the compound is a Group I compound.

As in any embodiment above, a fertilizer product wherein the at least one sulfonate group has the structure (4)(ii), with the "**" representing the bonding of the S—O oxygen to the central carbon atom C.

As in any embodiment above, a fertilizer product further including a polyanionic tetrapolymer comprising sulfonate repeat units.

As in any embodiment above, a fertilizer product wherein the tetrapolymer comprises maleic, itaconic, and sulfonate repeat units.

As in any embodiment above, a fertilizer product wherein the tetrapolymer is present at a level sufficient to increase the control of enzyme-induced urea decomposition, as compared with use of the compound alone.

As in any embodiment above, a fertilizer product wherein the urea-containing fertilizer is a liquid fertilizer, the compound being mixed with the liquid fertilizer.

As in any embodiment above, a fertilizer product wherein the urea-containing fertilizer is a solid fertilizer, the compound being coated with, mixed with, impregnated with, or in contact with the fertilizer.

As in any embodiment above, a fertilizer product wherein the triarylmethane compound is a polymethylated pararosaniline. In a further embodiment, a fertilizer product wherein the compound is methyl violet.

As in any embodiment above, a fertilizer product wherein the weight ratio of polyanionic tetrapolymer to triarylmethane compound is from about 1:99 to about 99:1. In further embodiments, a fertilizer product wherein the weight ratio of polyanionic tetrapolymer to triarylmethane compound is from about 1:4 to about 4:1.

As in any embodiment above, a fertilizer product wherein the color of the fertilizer product is pH-dependent.

As in any embodiment above, a fertilizer product wherein the fertilizer product decreases urease activity by at least about 50%. In further embodiments, a fertilizer product wherein the fertilizer product decreases urease activity by at least about 75%.

As in any embodiment above, a fertilizer product wherein the product further comprises poly(styrene sulfonate). In some embodiments, the poly(styrene sulfonate) is present in concentrations of from about 0.01% to about 2% (or about 0.01%, 0.05%, 0.1%, 0.2%, 0.25%, 0.3%, 0.4%, 0.5%, 0.6%, 0.7%, 0.8%, 0.9%, 1.0%, 1.1%, 1.2%, 1.3%, 1.4%, 1.5%, 1.6%, 1.7%, 1.8%, 1.9%, or 2.0%, by volume in solution (i.e., v/v), or by weight (i.e., w/w), or ranges including and/or spanning the aforementioned values. For example, in some embodiments the concentration is in a range from about 0.01% to about 0.1%, from about 0.1% to about 0.25%, from about 0.25% to about 0.50%, from about 0.5% to about 1.0%, or from about 1.0% to about 2.0%.

As used herein, the term "fertilizer" or "fertilizer product" refers to a substance, composition, or product that contains a plant nutrient, where the plant nutrient is designed to have use, or claimed to have value in promoting plant growth. Non-limiting examples of fertilizers are urea and ammonium sulfate fertilizers.

Synergists for Use with the Compounds of the Invention

It has been discovered that a certain class of polyanionic polymers, when used in combination with the Group I and/or Group II compounds, can provide additional measures of inhibition of enzyme-induced urea decomposition; advantageously, the combined triarylmethane compound(s)/polymeric synergist(s) compositions should exhibit an inhibition of enzyme-induced urea decomposition which is greater than the sum of the inhibitions separately derived from the individual components of the compositions. These synergists are tetrapolymers containing sulfonate moieties or repeat units, and are fully described in WO 2015/031521, which is incorporated by reference herein in its entirety.

Such tetrapolymers are composed of at least four different repeat units individually and independently selected from the group consisting of type B, type C, and type G repeat units, and mixtures thereof, described in detail below. However, the polymers comprehend polymers having more than four distinct repeat units, with the excess repeat units being selected from the group consisting of type B, type C, and type G repeat units, and mixtures thereof, as well as other monomers or repeat units not being type B, C, or G repeat units.

Preferred polymers contain at least one repeat unit from each of the B, C, and G types, one other repeat unit selected from the group consisting of type B, type C, and type G repeat units, and optionally other repeat units not selected from type B, type C, and type G repeat units. Particularly preferred polymers comprise a single type B repeat unit, a single type C repeat unit, and two different type G repeat units, or two different type B repeat units, a single type C repeat unit, and one or more different type G repeat units.

However constituted, preferred polymers contain at least about 90 mole percent (more preferably at least about 96 mole percent) of repeat units selected from the group consisting of type B, C, and G repeat units (i.e., the polymers should contain no more than about 10 mole percent (preferably no more than about 4 mole percent) of repeat units not selected from types B, C, and G). The most preferred final polymers should be substantially free of ester groups (i.e., no more than about 5 mole percent ester groups, more preferably no more than about 1 mole percent).

The polymers may be converted to a wide range of salts, whether fully saturated (wherein all anionic groups are paired with a suitable cation, e.g., a metal or amine) or partial (wherein not all anionic groups are so paired), and may be made using either a single cation (e.g., sodium), or using any number of different cations at any level (e.g., mixed sodium and ammonium cations). Metal cations can be simple cations such as sodium or calcium, but more complex cations can also be used, such as cations containing a metal atom and other atom(s) as well, e.g., vanadyl cations. Among preferred metal cations (to be used alone or as mixed salts) are those derived from alkali, alkaline earth, and transition metals. The polymers may also be in the form of amine partial or complete salts (as used herein, "amines" refers to primary, secondary, or tertiary amines, monoamines, diamines, and triamines, as well as ammonia, ammonium ions, quaternary amines, quaternary ammonium ions, alkanolamines (e.g., ethanolamine, diethanolamine, and triethanolamine), and tetraalkylammonium species). The most preferred class of amines are alkyl amines, where the alkyl group(s) have from 1-30 carbon atoms and are of straight or branched chain configuration. Such amines should be essentially free of aromatic rings (no more than about 5 mole percent aromatic rings, and more preferably no more than about 1 mole percent thereof). A particularly suitable alkyl amine is isopropylamine.

As used herein, the term "alkyl" refers to a fully saturated aliphatic hydrocarbon group. The alkyl moiety may be branched or straight chain. Examples of branched alkyl groups include, but are not limited to, iso-propyl, sec-butyl, t-butyl and the like. Examples of straight chain alkyl groups include, but are not limited to, methyl, ethyl, n-propyl, n-butyl, n-pentyl, n-hexyl, n-heptyl and the like. The alkyl group may have 1 to 30 carbon atoms (whenever it appears herein, a numerical range such as "1 to 30" refers to each integer in the given range; e.g., "1 to 30 carbon atoms" means that the alkyl group may consist of 1, 2, 3, 4, 5, 6, 7, 8, 9, 10, etc., up to and including 30 carbon atoms, although the present definition also covers the occurrence of the term "alkyl" where no numerical range is designated). The alkyl group may also be a medium size alkyl having 1 to 12 carbon atoms. The alkyl group could also be a lower alkyl having 1 to 6 carbon atoms. An alkyl group may be substituted or unsubstituted. By way of example only, "$C_1$-$C_5$ alkyl" indicates that there are one to five carbon atoms in the alkyl chain, i.e., the alkyl chain is selected from methyl, ethyl, n-propyl, isopropyl, n-butyl, isobutyl, tert-butyl, pentyl (branched and straight-chained), etc. Typical alkyl groups include, but are in no way limited to, methyl, ethyl, propyl, isopropyl, butyl, isobutyl, tertiary butyl, pentyl and hexyl.

As used herein, "aryl" refers to a carbocyclic (all carbon) monocyclic or multicyclic (such as bicyclic) aromatic ring system (including fused ring systems where two carbocyclic rings share a chemical bond) that has a fully delocalized pi-electron system throughout all the rings. The number of carbon atoms in an aryl group can vary. For example, the aryl group can be a $C_6$-$C_{14}$ aryl group, a $C_6$-$C_{10}$ aryl group or a $C_6$ aryl group. Examples of aryl groups include, but are not limited to, benzene, naphthalene and azulene. An aryl group may be substituted or unsubstituted.

The degree of cation substitution and the identity of cation(s) may be varied completely independently of each other. This flexibility allows production of many different full or partial salt polymers of desirable properties. The solubility and other properties of the polymers can be modified by judicious selection of the types and amounts of salt-forming cations. For example, by increasing the level of divalent cations (e.g., Ca, Mg) and elevating the pH of aqueous dispersions of the polymers above pH 1, the resultant polymer salts are especially useful as films and coatings.

1. Type B Repeat Units

Type B repeat units in accordance with the invention are dicarboxylate repeat units derived from monomers of maleic acid and/or anhydride, fumaric acid and/or anhydride, mesaconic acid and/or anhydride, substituted maleic acid and/or anhydride, substituted fumaric acid and/or anhydride, substituted mesaconic acid and/or anhydride, mixtures of the foregoing, and any isomers, esters, acid chlorides, and partial or complete salts of any of the foregoing. As used herein with respect to the type B repeat units, "substituted" species refers to alkyl substituents (preferably $C_1$-$C_6$ straight or branched chain alkyl groups substantially free of ring structures), and halo substituents (i.e., no more than about 5 mole percent of either ring structures or halo substituents, preferably no more than about 1 mole percent of either); the substituents are normally bound to one of the carbons of a carbon-carbon double bond of the monomer(s) employed. Similarly, the "salts" of the type B repeat units refers to partial or complete salts prepared using salt-forming cations selected from the group consisting of metals, amines, and mixtures thereof. In preferred forms, the total amount of type B repeat units in the polymers of the invention should range from about 1-70 mole percent, more preferably from about 20-65 mole percent, and most preferably from about 35-55 mole percent, where the total amount of all of the repeat units in the polymer is taken as 100 mole percent.

Maleic acid, methylmaleic acid, maleic anhydride, methylmaleic anhydride, and mesaconic acid (either alone or as various mixtures) are the most preferred monomers for generation of type B repeat units. Those skilled in the art will appreciate the usefulness of in situ conversion of acid anhydrides to acids in a reaction vessel just before or even during a reaction. However, it is also understood that when corresponding esters (e.g., maleic or citraconic esters) are used as monomers during the initial polymerization, this should be followed by hydrolysis (acid or base) of pendant ester groups to generate a final carboxylated polymer substantially free of ester groups.

2. Type C Repeat Units

Type C repeat units in accordance with the invention are derived from monomers of itaconic acid and/or anhydride, substituted itaconic acid and/or anhydride, as well as isomers, esters, acid chlorides, and partial or complete salts of any of the foregoing. The type C repeat units are present in the preferred polymers of the invention at a level of from about 1-80 mole percent, more preferably from about 15-75 mole percent, and most preferably from about 20-55 mole percent, where the total amount of all of the repeat units in the polymer is taken as 100 mole percent.

The itaconic acid monomer used to form type C repeat unit has one carboxyl group, which is not directly attached to the unsaturated carbon-carbon double bond used in the polymerization of the monomer. Hence, the preferred type C repeat unit has one carboxyl group directly bound to the polymer backbone, and another carboxyl group spaced by a carbon atom from the polymer backbone. The definitions and discussion relating to "substituted," "salt," and useful salt-forming cations (metals, amines, and mixtures thereof) with respect to the type C repeat units, are the same as those set forth for the type B repeat units.

Unsubstituted itaconic acid and itaconic anhydride, either alone or in various mixtures, are the most preferred monomers for generation of type C repeat units. Again, if itaconic anhydride is used as a starting monomer, it is normally useful to convert the itaconic anhydride monomer to the acid form in a reaction vessel just before or even during the polymerization reaction. Any remaining ester groups in the polymer are normally hydrolyzed, so that the final carboxylated polymer is substantially free of ester groups.

3. Type G Repeat Units

Type G repeat units in accordance with the invention are derived from substituted or unsubstituted sulfonate-bearing monomers possessing at least one carbon-carbon double bond and at least one sulfonate group, in acid, partial or complete salt, or other form, and which are substantially free of aromatic rings and amide groups (i.e., no more than about 5 mole percent of either aromatic rings or amide groups, preferably no more than about 1 mole percent of either). The type G repeat units are preferably selected from the group consisting of $C_1$-$C_8$ straight or branched chain alkenyl sulfonates, substituted forms thereof, and any isomers or salts of any of the foregoing; especially preferred are alkenyl sulfonates selected from the group consisting of vinyl, allyl, and methallylsulfonic acids or salts. The total amount of type G repeat units in the polymers of the invention should range from about 0.1-65 mole percent, more preferably from about 1-35 mole percent, and most preferably from about 1-25 mole percent, where the total amount of all of the repeat units in the polymer is taken as 100 mole percent. The definitions and discussion relating to "substituted," "salt," and useful salt-forming cations (metals, amines, and mixtures thereof) with respect to the type G repeat units, are the same as those set forth for the type B repeat units.

Vinylsulfonic acid, allylsulfonic acid, and methallylsulfonic acid, either alone or in various mixtures, are deemed to be the most preferred monomers for generation of type G repeat units. It has also been found that alkali metal salts of these acids are also highly useful as monomers. In this connection, it was unexpectedly discovered that during polymerization reactions yielding the novel polymers of the invention, the presence of mixtures of alkali metal salts of these monomers with acid forms thereof does not inhibit completion of the polymerization reaction. By the same token, mixtures of monomers of maleic acid, itaconic acid, sodium allyl sulfonate, and sodium methallyl sulfonate do not inhibit the polymerization reaction.

As noted previously, the total abundance of type B, C, and G repeat units in the polymers of the invention is preferably at least about 90 mole percent, more preferably at least about 96 mole percent, and most preferably the polymers consist essentially of or are 100 mole percent B, C, and G-type repeat units. It will be understood that the relative amounts and identities of polymer repeat units can be varied, depending upon the specific properties desired in the resultant polymers. Moreover, it is preferred that the polymers of the invention contain no more than about 10 mole percent (more preferably no more than about 5 mole percent) of any of (i) non-carboxylate olefin repeat units, (ii) ether repeat units, (iii) ester repeat units, (iv) non-sulfonated monocarboxylic repeat units, and (v) amide-containing repeat units. "Non-carboxylate" and "non-sulfonated" refers to repeat units having essentially no carboxylate groups or sulfonate groups in the corresponding repeat units. Advantageously, the mole ratio of the type B and type C repeat units in combination to the type G repeat units (that is, the mole ratio of (B+C)/G) should be from about 0.5-20:1, more preferably from about 2:1-20:1, and still more preferably from about 2.5:1-10:1. Still further, the polymers should be essentially free (e.g., less than about 1 mole percent) of alkyloxylates or alkylene oxide (e.g., ethylene oxide)-containing repeat units, and most desirably entirely free thereof.

The preferred polymers of the invention have the repeat units thereof randomly located along the polymer chain without any ordered sequence of repeat units. Thus, the polymers hereof are not, e.g., alternating with different repeat units in a defined sequence along the polymer chain.

It has also been determined that the preferred polymers of the invention should have a very high percentage of the repeat units thereof bearing at least one anionic group, e.g., at least about 80 mole percent, more preferably at least about 90 mole percent, still more preferably at least about 95 mole percent, and most preferably essentially all of the repeat units contain at least one anionic group. It will be appreciated that the B and C repeat units have two anionic groups per repeat unit, whereas the preferred sulfonate repeat units have one anionic group per repeat unit.

For use as synergists, certain tetrapolymer compositions are preferred, i.e., a preferred polymer backbone composition range (by mole percent, using the parent monomer names of the corresponding repeat units) is: maleic acid 35-50%; itaconic acid 20-55%; methallylsulfonic acid 1-25%; and allylsulfonic sulfonic acid 1-20%, where the total amount of all of the repeat units in the polymer is taken as 100 mole percent. It has also been found that even small amounts of repeat units, which are neither B nor C repeat units, can significantly impact the properties of the final polymers, as compared with prior BC polymers. Thus, even 1 mole percent of each of 2 different G repeat units can result in a tetrapolymer exhibiting drastically different behaviors, as compared with BC polymers.

The molecular weight of the polymers is also highly variable, again depending principally upon the desired properties. Generally, the molecular weight distribution for polymers is conveniently measured by size exclusion chromatography. Broadly, the molecular weight of the polymers ranges from about 800-50,000, and more preferably from about 1000-5000. For some applications, it is advantageous that at least 90% of the finished polymer be at or above a molecular weight of about 1000 measured by size exclusion chromatography in 0.1 M sodium nitrate solution via refractive index detection at 35° C. using polyethylene glycol standards. Of course, other techniques for such measurement can also be employed.

The polymers of the invention may be mixed with or complexed with metal or non-metal ions, and especially those selected from the group of simple cations such as the amines, alkali metals, Fe, Mn, Mg, Zn, Cu, Ni, Co, Mo, V, Cr, Si, B, Ca, and compounds containing these cations, e.g., boric acid, borates, molybdates, more complex cations such as vanadyl ions $[VO]^{2+}$, and other complex ions containing vanadium, and mixtures of any of the foregoing.

One particular synergist polymer designated "T5," is a partial sodium salt of a maleic/itaconic/sulfonate copolymer having 45 mol percent maleic repeat units, 50 mol percent itaconic repeat units, 4 mol percent methylallyl sulfonic repeat units, and 1 mol percent allylsulfonic repeat units. In some embodiments, variants of the T5 polymer include mixed sodium and zinc partial salts having about 5% w/w Zn on a metals basis and with a pH of about 3. In some embodiments, the T5 polymer is made by reacting the T5 tetrapolymer with basic zinc carbonate in water. In other embodiments, the polymer may be made by reaction with zinc metal.

Inhibitor Compositions and Uses

The triarylmethane compounds of the invention can be formulated using a single such compound, or multiple compounds. When one or more tetrapolymer synergists are employed, the latter are used at a weight ratio of synergist(s) to triarylmethane compound(s) from about 1:4 to 4:1, more preferably from about 1:3 to 3:1. In some embodiments, the weight ratios may range from 99:1 to 1:99 (or 99:1, 98:2, 97:3, 96:4, 95:5, 94:6, 93:7, 92:8, 91:9, 90:10, 89:11, 88:12, 87:13, 86:14, 85:15, 84:16, 83:17, 82:18, 81:19, 80:20, 79:21, 78:22, 77:23, 76:24, 75:25, 74:26, 73:27, 72:28, 71:29, 70:30, 69:31, 68:32, 67:33, 66:34, 65:35, 64:36, 63:37, 62:38, 61:39, 60:40, 59:41, 58:42, 57:43, 56:44, 55:45, 54:46, 53:47, 52:48, 51:49, 50:50, 49:51, 48:52, 47:53, 46:54, 45:55, 44:56, 43:57, 42:58, 41:59, 40:60, 39:61, 38:62, 37:63, 36:64, 35:65, 34:66, 33:67, 32:68, 31:69, 30:70, 29:71, 28:72, 27:73, 26:74, 25:75, 24:76, 23:77, 22:78, 21:79, 20:80, 19:81, 18:82, 17:83, 16:84, 15:85, 14:86, 13:87, 12:88, 11:89, 10:90, 9:91, 8:92, 7:93, 6:94, 5:93, 4:96, 3:97, 2:98 or 1:99). Generally, the amount of synergist is dependent upon the effectiveness of the synergist in enhancing the inhibitory effect of the triarylmethane compounds. No particular method is required for preparing the triarylmethane/synergist formulations, and typically they are simply mixed together as aqueous dispersions.

As used herein, the term "inhibitor" is meant to mean a molecule that inhibits activity of urease. By "inhibit" herein is meant to decrease the activity of the target enzyme, as compared to the activity of that enzyme in the absence of the inhibitor. In some embodiments, the term "inhibit" means a decrease in urease activity of at least about 5%, at least about 10%, at least about 20%, at least about 25%, at least about 50%, at least about 60%, at least about 70%, at least about 75%, at least about 80%, at least about 90%, or at least about 95%. In other embodiments, inhibit means a decrease in urease activity in a range of about 5% to about 10%, about 10% to about 25%, about 25% to about 50%, about 50% to about 75%, or about 75% to about 95%. In some embodiments, inhibit means a decrease in urease activity of about 95% to 100%, e.g., a decrease in activity of 95%, 96%, 97%, 98%, 99%, or 100%. Such decreases can be measured using a variety of techniques that would be recognizable by one of skill in the art.

Formulated products according to the invention may contain additional useful ingredients, such as solvent(s), colorant(s), coating performance enhancement additive(s), dust control additive(s), and other additive(s) that are useful in agricultural contexts, including but not limited to pesticides, plant nutrients, and the like. The formulated products may be in the form of solids, dispersions, suspensions, solutions, and colloids (e.g., gels, sols, and emulsions).

In some embodiments, the compositions and fertilizer products described herein are prepared in a known manner, e.g. by combining triarylmethane and/or tetrapolymer compounds with solvents and/or carriers, if desired using surface-active substances, i.e. emulsifiers and dispersants. Solvents/auxiliaries which are suitable are essentially: water, aromatic solvents (for example Solvesso products, xylene), paraffins (for example mineral fractions), alcohols (for example methanol, butanol, pentanol, benzyl alcohol), ketones (for example cyclohexanone, methyl hydroxybutyl ketone, diacetone alcohol, mesityl oxide, isophorone), lactones (for example gamma-butyrolacton), pyrrolidones (pyrrolidone, N-methylpyrrolidone, N-ethylpyrrolidone, n-octylpyrrolidone), acetates (glycol diacetate), glycols, glycerol, fatty acid dimethylamides, fatty acids and fatty acid esters. In principle, solvent mixtures may also be used.

Carriers such as ground natural minerals (e.g. kaolins, clays, talc, chalk) and ground synthetic minerals (e.g. highly disperse silica, silicates); emulsifiers such as nonionic and anionic emulsifiers (e.g. polyoxyethylene fatty alcohol ethers, alkylsulfonates and arylsulfonates) and dispersants such as lignin-sulfite waste liquors and methylcellulose.

Suitable surfactants are alkali metal, alkaline earth metal and ammonium salts of ligno-sulfonic acid, naphthalenesulfonic acid, phenolsulfonic acid, dibutylnaphthalenesulfonic acid, alkylarylsulfonates, SDS, alkyl sulfates, alkylsulfonates, fatty alcohol sulfates, fatty acids and sulfated fatty alcohol glycol ethers, furthermore condensates of sulfonated naphthalene and naphthalene derivatives with formaldehyde, condensates of naphthalene or of naphthalenesulfonic acid with phenol and formaldehyde, polyoxyethylene octyl-phenyl ether, ethoxylated isooctylphenol, octylphenol, nonylphenol, alkylphenyl poly-glycol ethers, tributylphenyl polyglycol ether, tristearylphenyl polyglycol ether, alkylaryl polyether alcohols, alcohol and fatty alcohol/ethylene oxide condensates, ethoxylated castor oil, polyoxyethylene alkyl ethers, ethoxylated polyoxypropylene, lauryl alcohol, polyglycol ether acetal, sorbitol esters, lignin-sulfite waste liquors and methylcellulose.

Substances which are suitable for the preparation of directly sprayable solutions, emulsions, pastes or oil dispersions are mineral oil fractions of medium to high boiling point, such as kerosene or diesel oil, furthermore coal tar oils and oils of vegetable or animal origin, aliphatic, cyclic and aromatic hydrocarbons, for example toluene, xylene, paraffin, tetrahydronaphthalene, alkylated naphthalenes or their derivatives, methanol, ethanol, propanol, butanol, cyclohexanol, cyclohexanone, mesityl oxide, isophorone, strongly polar solvents, for example dimethyl sulfoxide, 2-pyrrolidone, N-methylpyrrolidone, butyrolactone and water.

Powders, materials for spreading and dusts can be prepared by mixing or concomitantly grinding the active substances with a solid carrier.

Granules, for example coated granules, impregnated granules and homogeneous granules, can be prepared by binding the active ingredients to solid carriers. Examples of solid carriers are mineral earths such as silica, gels, silicates, talc, kaolin, attaclay, limestone, lime, chalk, bole, loess, clay, dolomite, diatomaceous earth, calcium sulfate, magnesium sulfate, magnesium oxide, ground synthetic materials, fertilizers, such as, for example, ammonium sulfate, ammonium phosphate, ammonium nitrate, ureas, and products of vegetable origin, such as cereal meal, tree bark meal, wood meal and nutshell meal, cellulose powders and other solid carriers.

In some embodiments, the triarylmethane and/or tetrapolymers as described herein are prepared as liquid compositions in an aqueous carrier, such as water.

The compositions of the invention may be directly applied to soil, independently of or in conjunction with application of urea-containing fertilizer(s). Where the compositions are applied as a part of soil fertilization, the compositions should be applied within a time window of about five days before or after fertilizer application, in order to obtain the most effective results.

Particularly useful compositions comprise urea-containing fertilizers, and especially urea itself, coated with, mixed with, impregnated with, or in contact with the inhibitor compositions hereof. The urea-containing fertilizers may be in solid or granular form, or as liquids, such as UAN. The compositions of the invention, however used with urea-containing fertilizers, should be present at a level of from about 1 ppm-4%, more preferably from about 5 ppm-1% by weight, based upon the total fertilizer actives taken as 100% by weight. The inhibitor compositions may also be applied to or mixed with other agricultural materials, such as manures.

However formulated, the compositions of the invention are usually applied to soil in quantities sufficient to inhibit the decomposition of urea by the action of soil-borne urease inhibitors. The mode of application is irrelevant to the effectiveness of the compositions, and may be done by any technique common in the art. In some embodiments, the application is accomplished by spraying, misting, atomizing, scattering or pouring. The use forms and use methods depend on the intended purposes.

The compositions of the invention provide a number of useful advantages. Among these are: relatively favorable toxicology and health profiles, good water solubility, low volatility, and stability to air oxidation over extended time periods. Furthermore, the compositions may act as indicator dyes, or as simple dyes. These properties allow convenient, simple, inexpensive, and accurate measurement of the amounts of the compositions employed, using widely available spectrometry instruments. Moreover, the compositions can provide a visual estimate of product pH.

As disclosed herein in some embodiments is a method of controlling enzyme-induced urea decomposition comprising the step of applying to soil a triarylmethane compound in a quantity sufficient to inhibit the decomposition of urea by the action of soil-borne urease inhibitor, wherein the triarylmethane compound comprises a central carbon atom C bonded with three individual aryl groups X, Y, and Z, where:

(1) the aryl group X has the structure

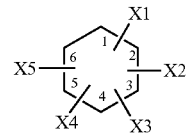

where the carbon atom C is bonded at position 1, and X1-X5, inclusive, are H or substituents bonded at any of the positions 2-6;

(2) the aryl group Y has the structure

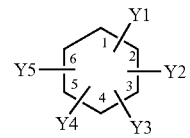

where the carbon atom C is bonded at position 1, and Y1-Y5, inclusive, are H or substituents bonded at any of the positions 2-6;

(3) the aryl group Z has the structure

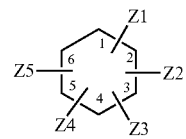

where the carbon atom C is bonded at position 1, and Z1-Z5, inclusive, are H or substituents bonded at any of the positions 2-6, where the selected substituents X2-X6, inclusive, Y2-Y6, inclusive, and Z2-Z6, inclusive belong to group I or group II, where the group I substituents are:
(A) at least one of X2-X6, inclusive, Y2-Y6, inclusive, and/or Z2-Z6, inclusive, is a sulfonate group bonded at any of the positions 2-6 of the corresponding aryl ring(s) X, Y, and/or Z, the at least one sulfonate group comprising the structure (i)

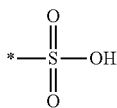 [SMILES: *S(=O)(=O)O]

or the structure (ii)

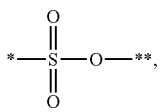

where "*" represents the bonding of the sulfate group to the corresponding X, Y, or Z aryl group, and "**" represents the bonding of the sulfate group to another atom of the compound;

(B) at least two of X1-X5, inclusive, Y1-Y5, inclusive, and/or Z1-Z5, inclusive, are substituents comprising an oxygen atom bonded to the corresponding aryl ring(s) X, Y, and/or Z, and selected from the group consisting of 0 and OH, with the proviso that no more than two such oxygen atoms are present in any of the X, Y, and Z aryl groups;

(C) X1-X5, inclusive, Y1-Y5, inclusive, and/or Z1-Z5, inclusive, which are not the substituents of paragraphs (A) and (B), are all H, the group II constituents are:

(D) at least one nitrogen substituent is bonded to at least one of the aryl groups X, Y, and/or Z, where the nitrogen substituent is selected from the group consisting of

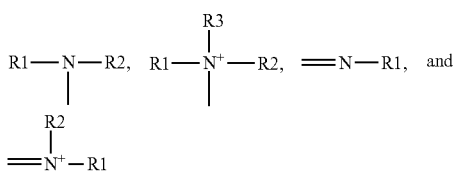

where R1, R2, and R3 are independently selected from the group consisting of H, $CH_3$, and $C_2H_5$, (E) the remainder of the substituents X2-X6, Y2-Y6, and Z2-Z6 are independently selected from the group consisting of H, $CH_3$, and $C_2H_5$.

As in any embodiment above, a method wherein the Group I triarylmethane compound has a single sulfonate group.

As in any embodiment above, a method wherein the sulfonate group is bonded to the X, Y, or Z aryl ring at a position ortho to the bond between the corresponding ring and the central carbon atom C.

As in any embodiment above, a method wherein the central carbon atom C is the only carbon atom of the compound not a part of an aryl ring.

As in any embodiment above, a method wherein the Group I compounds have at least two of the aryl rings X, Y, and Z with two substituents each which have an oxygen atom bonded to the corresponding aryl rings.

As in any embodiment above, a method wherein at least one aryl ring of the two aryl rings has two hydroxyl substituents.

As in any embodiment above, a method wherein each of the two aryl rings has two hydroxyl substituents.

As in any embodiment above, a method wherein each of the two hydroxyl substituents on each of the two aryl rings are positioned ortho to each other.

As in any embodiment above, a method wherein at least one aryl ring of the two aryl rings has one hydroxyl substituent and one oxygen substituent.

As in any embodiment above, a method wherein each of the two aryl rings has one hydroxyl substituent and one oxygen substituent.

As in any embodiment above, a method wherein the compound is 3,3',4-trihydroxysuchsone-2"-sulfonic acid.

As in any embodiment above, a method wherein the triarylmethane compound has the structure

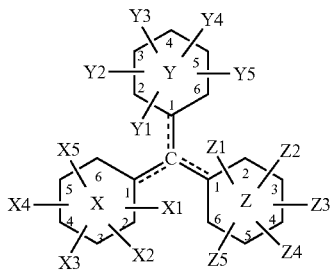

where one of the bonds between the central carbon atom C and one of the aryl rings X, Y, or Z is a double bond, and the remaining two bonds are single bonds, the at least one sulfonate group comprising the structure (4)(i) when the triarylmethane compound is a Group I compound.

As in any embodiment above, a method wherein the at least one sulfonate group has the structure (4)(ii), with the "**" representing the bonding of the S—O oxygen to the central carbon atom C.

As in any embodiment above, a method further including the step of applying the compound in conjunction with a urea-containing fertilizer.

As in any embodiment above, a method wherein the compound and urea-containing fertilizer are applied separately.

As in any embodiment above, a method wherein the compound and the urea-containing fertilizer are applied simultaneously.

As in any embodiment above, a method wherein the compound is contacted with the urea-containing fertilizer prior to the application thereof.

As in any embodiment above, a method wherein the compound is in combination with a polyanionic tetrapolymer comprising sulfonate repeat units.

As in any embodiment above, a method wherein the tetrapolymer comprises maleic, itaconic, and sulfonate repeat units.

As in any embodiment above, a method wherein the tetrapolymer is present at a level to increase the control of enzyme-induced urea decomposition, as compared with use of the compound alone.

As in any embodiment above, a method wherein the urea-containing fertilizer is a liquid fertilizer, the compound being mixed with the liquid fertilizer.

As in any embodiment above, a method wherein the urea-containing fertilizer is a solid fertilizer, the compound being coated with, mixed with, impregnated with, or in contact with the fertilizer.

As in any embodiment above, a method wherein the triarylmethane compound is a polymethylated pararosaniline.

As in any embodiment above, a method wherein the compound is methyl violet.

As in any embodiment above, a method wherein the method decreases urease activity by at least about 50%. In further embodiments, a method wherein the method decreases urease activity by at least about 75%.

As in any embodiment above, a method wherein the method decreases nitrogen volatilization. In further embodiments, a method wherein the method decreases nitrogen volatilization by at least about 25% when compared to a control. In further embodiments, the method decreases nitrogen volatilization by at least about 50% when compared to a control. In some embodiments, the decrease in nitrogen volatilization is at least about 10%, 20%, 25%, 30%, 40%, 50%, 60%, 70%, 80%, or 90%, or ranges including and/or spanning the aforementioned values.

As in any embodiment above, a method wherein the method decreases nitrogen volatilization after about 3 days. In a further embodiment, the method decreases nitrogen volatilization after about 7 days. In some embodiments, the decrease occurs over a period of at least about 1, 2, 3, 4, 5, 6, 7, 8, 9, or 10 days, or ranges including and/or spanning the aforementioned values.

As in any embodiment above, a method which further comprises application of any composition described herein.

As in any embodiment above, a method wherein the composition comprises a triarylmethane compound in a range from about 0.01% to about 2.0%. In further embodiments, the composition comprises a triarylmethane compound in a range from about 0.05% to about 0.5%. In some embodiments, the compound is 3,3',4-trihydroxysuchsone-2"-sulfonic acid.

As in any embodiment above, a method wherein the composition comprises a tetrapolymer in a range from about 0.01% to about 2.0%. In further embodiments, the tetrapolymer in a range from about 0.25% to about 0.5%. In some embodiments, the tetrapolymer is the T5 polymer.

As in any embodiment above, a method wherein the composition further comprises poly(styrene sulfonate). In some embodiments, the poly(styrene sulfonate) is present in concentrations of from about 0.01% to about 2% (or about 0.01%, 0.05%, 0.1%, 0.2%, 0.25%, 0.3%, 0.4%, 0.5%, 0.6%, 0.7%, 0.8%, 0.9%, 1.0%, 1.1%, 1.2%, 1.3%, 1.4%, 1.5%, 1.6%, 1.7%, 1.8%, 1.9%, or 2.0%, by volume in solution (i.e., v/v), or by weight (i.e., w/w), or ranges including and/or spanning the aforementioned values. For example, in some embodiments the concentration is in a range from about 0.01% to about 0.1%, from about 0.1% to about 0.25%, from about 0.25% to about 0.50%, from about 0.5% to about 1.0%, or from about 1.0% to about 2.0%.

For the application of the composition, in some embodiments, the relevant formulations described herein will have compound concentrations of from about 0.01% to about 2% (or about 0.01%, 0.05%, 0.1%, 0.2%, 0.25%, 0.3%, 0.4%, 0.5%, 0.6%, 0.7%, 0.8%, 0.9%, 1.0%, 1.1%, 1.2%, 1.3%, 1.4%, 1.5%, 1.6%, 1.7%, 1.8%, 1.9%, or 2.0%, by volume in solution (i.e., v/v), or by weight (i.e., w/w), or ranges including and/or spanning the aforementioned values. For example, in some embodiments the concentration is in a range from about 0.01% to about 0.1%, from about 0.1% to about 0.25%, from about 0.25% to about 0.50%, from about 0.5% to about 1.0%, or from about 1.0% to about 2.0%.

As disclosed herein in some embodiments is the use of a triarylmethane compound for urease inhibition, wherein the compound comprises a central carbon atom C bonded with three individual aryl groups X, Y, and Z, where:

(1) the aryl group X has the structure

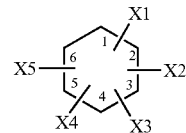

where the carbon atom C is bonded at position 1, and X1-X5, inclusive, are H or substituents bonded at any of the positions 2-6;

(2) the aryl group Y has the structure

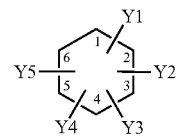

where the carbon atom C is bonded at position 1, and Y1-Y5, inclusive, are H or substituents bonded at any of the positions 2-6;

(3) the aryl group Z has the structure

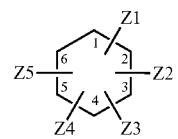

where the carbon atom C is bonded at position 1, and Z1-Z5, inclusive, are H or substituents bonded at any of the positions 2-6, where the selected substituents X2-X6, inclusive, Y2-Y6, inclusive, and Z2-Z6, inclusive, are:

(A) at least one of X2-X6, inclusive, Y2-Y6, inclusive, and/or Z2-Z6, inclusive, is a sulfonate group bonded at any of the positions 2-6 of the corresponding aryl ring(s) X, Y, and/or Z, the at least one sulfonate group comprising the structure (i)

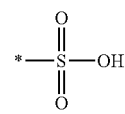

or the structure (ii)

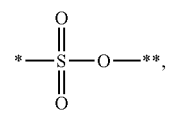

where "*" represents the bonding of the sulfate group to the corresponding X, Y, or Z aryl group, and "**" represents the bonding of the sulfate group to another atom of the compound;

(B) at least two of X1-X5, inclusive, Y1-Y5, inclusive, and/or Z1-Z5, inclusive, are substituents comprising an oxygen atom bonded to the corresponding aryl ring(s) X, Y, and/or Z, and selected from the group consisting of O and OH, with the proviso that no more than two such oxygen atoms are present in any of the X, Y, and Z aryl groups;

(C) X1-X5, inclusive, Y1-Y5, inclusive, and/or Z1-Z5, inclusive, which are not the substituents of paragraphs (A) and (B), are all H.

As in any embodiment above, the use of a triarylmethane compound for urease inhibition, wherein the triarylmethane compound has a single sulfonate group.

As in any embodiment above, the use of a triarylmethane compound for urease inhibition, wherein the sulfonate group is bonded to the X, Y, or Z aryl ring at a position ortho to the bond between the corresponding ring and the central carbon atom C.

As in any embodiment above, the use of a triarylmethane compound for urease inhibition, wherein the central carbon atom C is the only carbon atom of the compound not a part of an aryl ring.

As in any embodiment above, the use of a triarylmethane compound for urease inhibition, wherein the compound has at least two of the aryl rings X, Y, and Z with two substituents each which have an oxygen atom bonded to the corresponding aryl rings.

As in any embodiment above, the use of a triarylmethane compound for urease inhibition, wherein at least one aryl ring of the two aryl rings has two hydroxyl substituents.

As in any embodiment above, the use of a triarylmethane compound for urease inhibition, wherein each of the two aryl rings has two hydroxyl substituents.

As in any embodiment above, the use of a triarylmethane compound for urease inhibition, wherein each of the two hydroxyl substituents on each of the two aryl rings is positioned ortho to each other.

As in any embodiment above, the use of a triarylmethane compound for urease inhibition, wherein at least one aryl ring of the two aryl rings has one hydroxyl substituent and one oxygen substituent.

As in any embodiment above, the use of a triarylmethane compound for urease inhibition, wherein each of the two aryl rings has one hydroxyl substituent and one oxygen substituent.

As in any embodiment above, the use of a triarylmethane compound for urease inhibition, wherein the compound is 3,3',4-trihydroxysuchsone-2"-sulfonic acid.

As in any embodiment above, the use of a triarylmethane compound for urease inhibition, wherein the compound is a polymethylated pararosaniline.

As in any embodiment above, the use of a triarylmethane compound for urease inhibition, wherein the triarylmethane compound has the structure

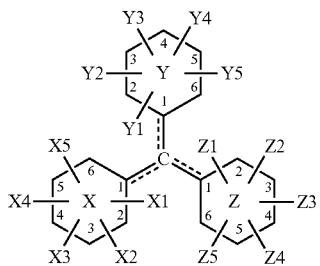

where one of the bonds between the central carbon atom C and one of the aryl rings X, Y, or Z is a double bond, and remaining two bonds are single bonds, the at least one sulfonate group has the structure (4)(i).

As in any embodiment above, the use of a triarylmethane compound for urease inhibition, wherein the at least one sulfonate group has the structure (4)(ii), with the "**" representing the bonding of the S—O oxygen to the central carbon atom C.

The term "effective amount," as used herein, refers to that amount of a recited compound that imparts a modulating effect, which, for example, can be a beneficial effect, as would be well known in the art. For example, an effective amount can refer to the amount of a composition, compound, or agent that improves a characteristic by at least 5%, e.g., at least 10%, at least 15%, at least 20%, at least 25%, at least 30%, at least 35%, at least 40%, at least 45%, at least 50%, at least 55%, at least 60%, at least 65%, at least 70%, at least 75%, at least 80%, at least 85%, at least 90%, at least 95%, or at least 100%.

Unless otherwise defined, all technical and scientific terms used herein have the same meaning as commonly understood by one of ordinary skill in the art to which this subject matter belongs. The terminology used in the description of the subject matter herein is for the purpose of describing particular embodiments only and is not intended to be limiting of the subject matter.

As used herein, "and/or" refers to and encompasses any and all possible combinations of one or more of the associated listed items, as well as the lack of combinations when interpreted in the alternative ("or").

As used herein, the term "about," when referring to a measurable value such as an amount of a compound or agent of the current subject matter, dose, time, temperature, bactericidal efficacy, and the like, is meant to encompass variations of ±20%, ±10%, ±5%, ±1%, ±0.5%, or even ±0.1% of the specified amount.

EXAMPLES

The following Examples set forth certain embodiments of the present invention. These Examples are provided by way of illustration only, and nothing therein should be taken as a limitation upon the overall scope of the invention.

Example 1—Urease Inhibition Using 3,3',4-Trihydroxysuchsone-2"-Sulfonic Acid—pH 5

An aqueous solution containing 0.105 moles/L of monosodium phosphate was adjusted to a pH of 5.0 with sodium hydroxide. Suitable quantities of a solution of 3,3',4-trihydroxysuchsone-2"-sulfonic acid were added, with stirring, to 19.0 mL of the above phosphate solution, to give a series of mixtures having the following concentrations of sulfonic acid: 100, 250, 500, 750, 1000, 2000, and 5000 ppb. Next, commercial jackbean urease enzyme solution of known concentration was added to each mixture to provide 40 units of enzyme per 50 mL of the mixture. The mixtures were allowed to stand for 5 hours in closed glass containers at 20° C., followed by the addition to each mixture of 1.00 mL of freshly prepared urea solution (2.00 moles/L), to give an overall reaction concentration of 0.100 moles/L of both urea and phosphate. These mixtures, containing phosphate, sulfonic acid, urease, and urea were deemed A mixtures.

Simultaneously, two more solutions were identically prepared, namely an enzyme-free control where both 3,3',4-trihydroxysuchsone-2"-sulfonic acid and enzyme are omitted (mixture B), and an enzyme control where enzyme is present without any 3,3',4-trihydroxysuchsone-2"-sulfonic acid (mixture C). Solution urea concentrations were measured immediately in each of the mixtures, and again after a 120-minute interval.

For purposes of these tests, the C mixture containing urease and urea was deemed to provide 0% inhibition, whereas the B mixture containing urea without urease was deemed to provide 100% inhibition. The seven A mixtures gave the following % inhibition results based upon this 0%-100% scale: 100 ppb-7%; 250 ppb-22%; 500 ppb-25%; 750 ppb-45%; 1000 ppb-61%; 2000 ppb-76%; and 5000 ppb-88%.

These tests confirm that the 3,3',4-trihydroxysuchsone-2"-sulfonic acid treatment of urease-containing solutions inhibits urease activity against urea. Moreover, the example illustrates that urea does not decompose without the presence of urease, i.e., the equipment and test conditions do not themselves decompose urea to any appreciable extent.

Example 2—Urease Inhibition Using 3,3',4-trihydroxysuchsone-2"-sulfonic acid—pH 7

Example 1 was repeated, but with the addition of a buffer to maintain a pH of 7.0 in all of the A, B, and C mixtures. The A mixtures contained the following amounts of the 3,3',4-trihydroxysuchsone-2"-sulfonic acid: 100, 250, 500, 750, and 1000 ppb. It is known in the art that urease enzyme activity is greater and more difficult to inhibit at neutral pH, as compared with an acid pH, and that the much lower treatment levels would give less urease inhibition.

The A mixtures gave the following % inhibitions: 100 ppb-2%; 250 ppb-30%; 500 ppb-41%; 750 ppb-46%; and 1000 ppb-50%. The observations noted in Example 1 also apply to this Example, which is significant inasmuch as the inhibition effect was achieved at lower treatment levels and at a neutral pH.

Example 3—Urease Inhibition Using 3,3',4-trihydroxysuchsone-2"-sulfonic acid in Combination with Dicarboxylic Copolymers The procedure of Example 1 was repeated with several test mixtures, namely the mixtures identified as D-G below, and the % urease inhibition values were determined as follows.

Mixture D: 100 ppm of maleic-itaconic copolymer and 1000 ppb of 3,3',4-trihydroxysuchsone-2"-sulfonic acid—53% inhibition Mixture E: 100 ppm of T5 tetrapolymer and 1000 ppb of 3,3',4-trihydroxysuchsone-2"-sulfonic acid—74% inhibition Mixture F: 50 ppm of maleic-itaconic copolymer and 500 ppb of 3,3',4-trihydroxysuchsone-2"-sulfonic acid—33% inhibition Mixture G: 50 ppm of T5 tetrapolymer and 500 ppb of 3,3',4-trihydroxysuchsone-2"-sulfonic acid—48% inhibition.

This test confirms that the use of the T5 tetrapolymer with the sulfonic acid inhibitor gave significantly greater % inhibition, as compared with the use of maleic-itaconic copolymers at the same dosage levels.

Example 4—an Agriculturally Useful Composition in Accordance with the Invention The following composition was prepared:
3,3',4-trihydroxysuchsone-2"-sulfonic acid—1% w/w
poly(styrene sulfonate), 70,000 MW—10% w/w
T5 tetrapolymer—40% w/w
water—balance.

The composition was prepared by adding 1000 g of a 40% dispersion of T5 tetrapolymer to a 2 L glass beaker, with vigorous stirring. 555.6 g of an 18% solution of the poly(styrene sulfonate) (also referred to herein as "JG polymer") was next added over a period of about 5 minutes. Subsequently, 10 g of 3,3',4-trihydroxysuchsone-2"-sulfonic acid was added and dissolved into the solution. The solution was then quantitatively transferred to a rotary evaporator flask and concentrated using vacuum distillation to remove water until the flask contents weighed 1000 g. The evaporation conditions were: temperature—50° C., vacuum—20-50 mbar, abs.

This composition was used to treat a liquid nitrogen fertilizer mixture, namely a urea-ammonium nitrate solution (UAN, or 32-0-0) by adding 0.5 mL of the composition to 99.5 mL of the UAN with stirring. A clear solution resulted having a blue-green color. The initial pH of the UAN solution (7.6) was first changed to 5.4 by citric acid addition at room temperature, resulting in a clear solution. Thereafter, the pH of the composition was further altered by additional citric acid to a pH of 4.7, giving a clear solution of yellow-orange color. This demonstrates that the color of the urease-inhibiting test composition is pH-dependent, which is a useful property, as explained above.

Example 5—Urease Inhibition Using Polymethylated Pararosaniline—pH 7

Example 2 was repeated using 100 ppm polymethylated pararosaniline (i.e., methyl violet having about 4-5 methyl group substitutions) in lieu of the sulfonic acid inhibitor of Examples 1-4. The % inhibition was found to be 63%. This test confirms the usefulness of this compound as a urease inhibitor; however, it would be desirable to enhance the activity of this inhibitor, because the amount needed to achieve significant inhibition was relatively high. Of course, compositions using lower doses of inhibitory compounds are preferred.

Example 6—Urease Inhibition Using Polymethylated Pararosaniline in Combination with T5 Tetrapolymer Example 3 was followed by the creation of a series of three test mixtures H, I, and J, where all had a total of 50 ppm (i.e., the sum of all ingredients). % inhibition values were determined as set forth in Example 3. The mixtures were:

Mixture H: a 3:1 weight ratio of T5 tetrapolymer to polymethylated pararosaniline—35% inhibition;
Mixture I: a 1:1 weight ratio of T5 tetrapolymer to polymethylated pararosaniline—50% inhibition;
Mixture J: a 1:3 weight ratio of T5 tetrapolymer to polymethylated pararosaniline—33% inhibition.

This example demonstrates that an unexpected synergistic effect is obtained by using the polymethylated pararosaniline and T5 tetrapolymer together. This effect was not observed using maleic-itaconic copolymer. That is, the 1:1 weight ratio mixture I used a concentration of polymethylated pararosaniline that was four times lower than the level of the composition of Example 5, and yet mixture I was only slightly less effective in terms of % inhibition. Without being bound by theory, it is believed that this type of synergistic effect exists for other polyanionic polymers, provided that they contain at least about 1 mole % of aliphatic sulfonate pendant groups.

Example 7—Treatment Data with Catechol Violet

Various concentrations of Catechol Violet paired with polymer, were examined utilizing the gas trap and FIA instrument at Alltech (Sparta, Ill.). Results are depicted using the box-and-whisker charts shown in the figures. Treatment replicates are shown across the horizontal axis, and percent Nitrogen concentration (expressed as ammonia that has volatilized) is given in the vertical axis. For FIGS. 1, 2, 4A, and 4B, the treatments proceed in number order along the horizontal axis, moving from left to right, with the left being the lowest treatment number and the right being the highest treatment number. For FIGS. 3A and 3B, the treatments proceed as described above, with the exception of treatment 7, which is the farthest right along the horizontal axis. Briefly, the lower the amount of volatilized nitrogen, the greater the inhibition of the activity of the urease enzyme.

Each set of treatments includes:
1) An untreated control (50:50 urea:water, w/w). This solution is also used as the solvent for each of the experimental treatments.
2) The industry standard for urease inhibition, NBPT (N-(n-butyl) thiophosphoric triamide), which historically exhibits near-total inhibition of N-volatilization, added at 0.2% v/v of the urea solution, and
3) Experimental treatments. Concentrations and details of each treatment are given in the following paragraphs.

7.1—Three Day Results of Catechol Violet Solutions (FIG. 1)

The three day volatility results of solutions in 50:50 water:urea solvent, with three different ratios of Catechol Violet to the polymer, T5 Acid, were examined (FIG. 1).
Treatment 1: Untreated Urea, 50:50 in Deionized water.
Treatment 2: NBPT (Agrotain Ultra) in the 50:50 Urea water solution, 0.2% v/v.
Treatment 3: Catechol Violet and T5 Acid, in the 50:50 urea: water solution at 0.1% w/w and 0.25% v/v, respectively.
Treatment 4: Catechol Violet and T5 Acid, in the 50:50 urea: water solution at 0.1% w/w and 0.5% v/v, respectively.
Treatment 5: Catechol Violet and T5 Acid, in the 50:50 urea: water solution at 0.5% w/w and 0.25% v/v, respectively.
Treatment 6: Catechol Violet and T5 Acid, in the 50:50 urea: water solution at 0.5% w/w and 0.25% v/v, respectively (same concentrations as previous treatment to verify accuracy).

As disclosed, utilizing Catechol Violet at a concentration of 0.5% v/v in solution with T5 Acid at a concentration of 0.25% v/v is the most successful of the experimental treatments at inhibiting urease activity and subsequent N-volatilization.

Figure 2:
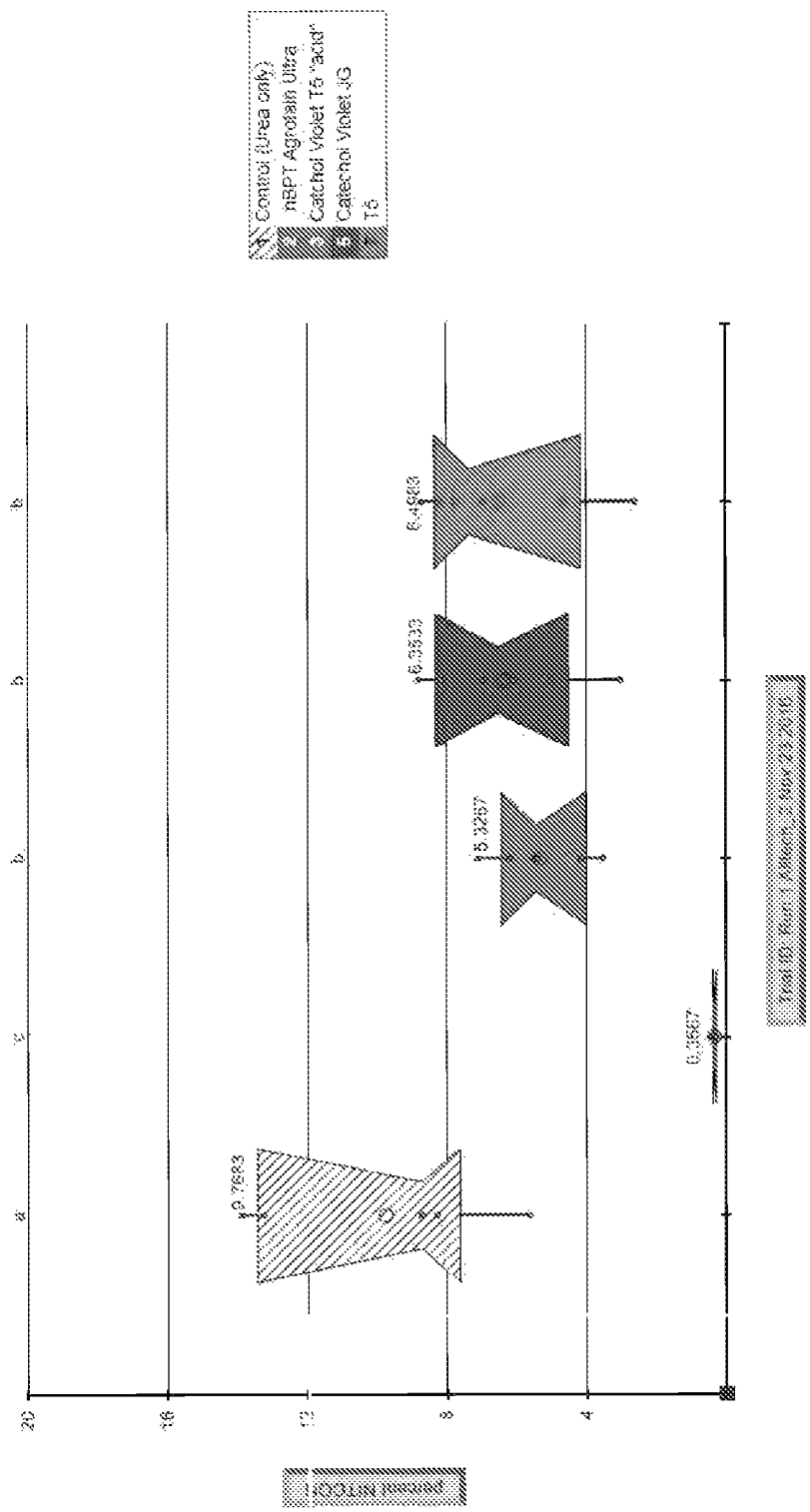
FIG. 2 shows the 3-day volatility results of solutions in the 50:50 water:urea solvent, with one treatment group including a polymer other than T5.

7.2—Three Day Results—FIG. 2

The three day volatility results of solutions in the 50:50 water: urea solvent, with one treatment group including a polymer other than T5, were examined (FIG. 2).

Treatment 1: Untreated Urea, 50:50 in Deionized water.
Treatment 2: NBPT (Agrotain Ultra) in the 50:50 Urea water solution, 0.2% v/v.
Treatment 3: Catechol Violet and T5 Acid, in the 50:50 urea: water solution at 0.5% w/w and 0.25% v/v, respectively.
Treatment 5: Catechol violet and JG Polymer, in the 50:50 urea:water solution at 0.5% w/w and 0.20% v/v, respectively.
Treatment 7: T5 Polymer alone, in the 50:50 urea: water solution at a concentration of 0.25% v/v.

As disclosed, no statistically significant difference was observed between the given concentrations of experimental products. All three reduce N-volatilization relative to the control.

Figure 3A:
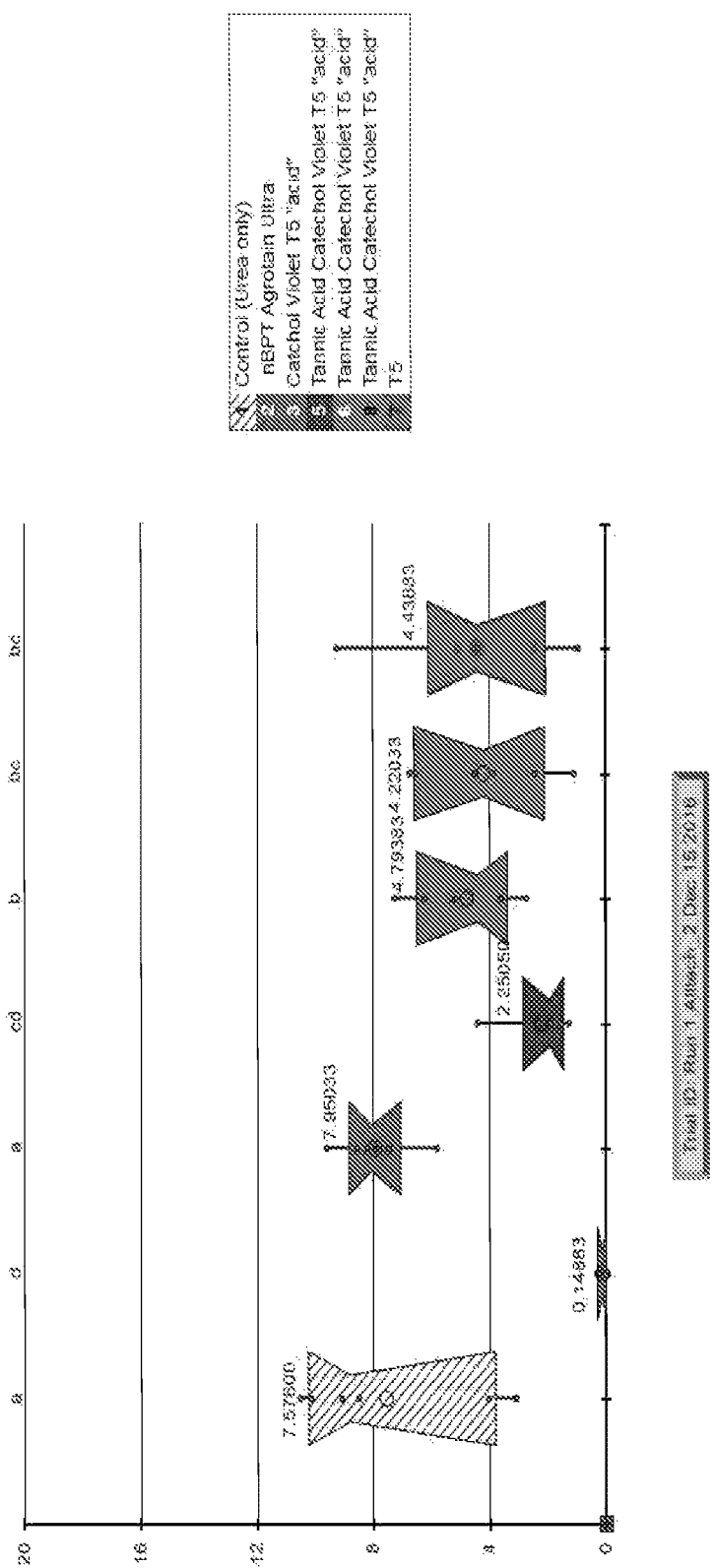
FIGS. 3A and 3B show the 3-day volatility (FIG. 3A) and the 7-day volatility (FIG. 3B) results of solutions in the 50:50 water:urea solvent, adding Tannic Acid as a component of several mixtures.
Figure 3B:
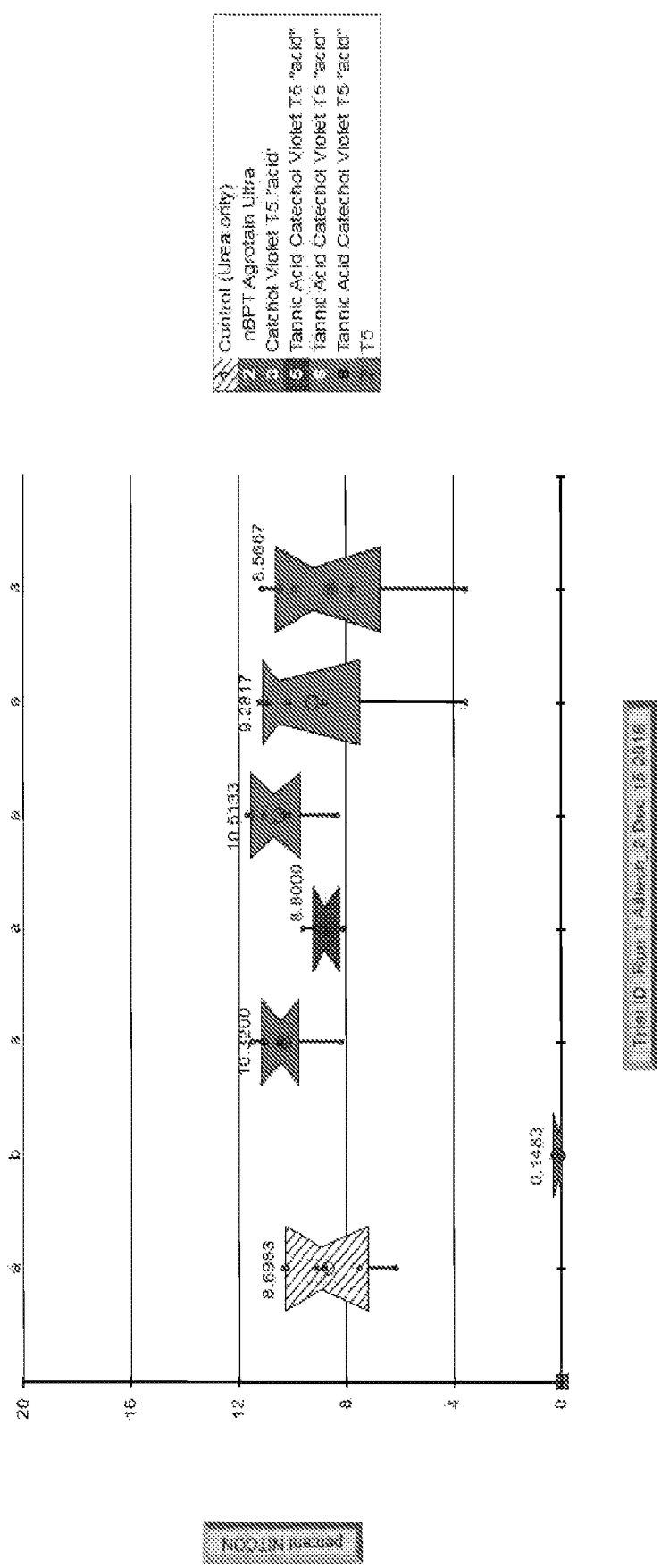

7.3—Three and Seven Day Results with Tannic Acid—FIGS. 3A and 3B

The three day volatility (FIG. 3A) and seven day (FIG. 3B) volatility results of solutions in the 50:50 water: urea solvent were examined. Adding Tannic Acid as a component to several mixtures was done to examine the possibility for reduced volatility.

Treatment 1: Untreated Urea, 50:50 in Deionized water.
Treatment 2: NBPT (Agrotain Ultra) in the 50:50 Urea water solution, 0.2% v/v.
Treatment 3: Catechol Violet and T5 Acid, each at 0.25% v/v in solution.
Treatment 5: Tannic Acid, Catechol Violet, and T5 Acid at concentrations of 0.125% v/v, 0.05% v/v, and 0.25% v/v, respectively.
Treatment 6: Tannic Acid, Catechol Violet, and T5 Acid at concentrations of 0.25% v/v, 0.05% v/v, and 0.25% v/v, respectively (doubling only the concentration of Tannic Acid from Treatment 5).
Treatment 7: T5 polymer on its own, at 0.25% v/v in solution.
Treatment 8: Tannic Acid, Catechol Violet, and T5 Acid at concentrations of 0.5% v/v, 0.05% v/v, and 0.25% v/v, respectively (Doubling only the concentration of Tannic Acid from Treatment 6).

After 3 Days of allowing nitrogen volatilization to occur, the treatment with the lowest amount of Tannic Acid performed best at reducing volatilization. After 7 days, that pattern remained consistent—however, there is no statistically significant difference between these given concentrations of experimental products (p=0.5). Seven days into the test, no products control N-volatilization statistically significantly better than application of urea solution alone. NBPT (Agrotain Ultra) inhibits urease activity and N-loss through volatilization.

Figure 4A:
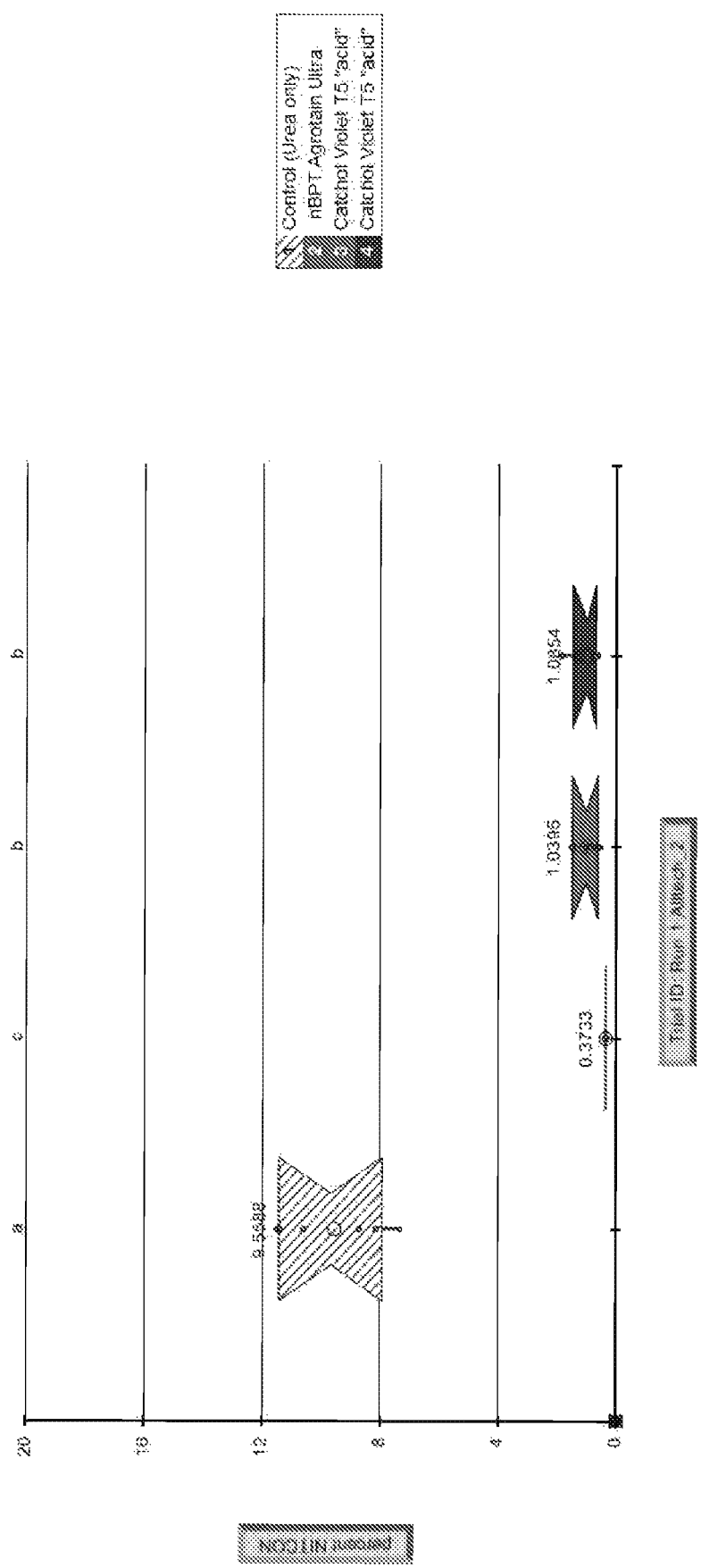
FIGS. 4A and 4B show the 3-day volatility (FIG. 4A) and the 7-day volatility (FIG. 4B) results of solutions in the 50:50 water:urea solvent.
Figure 4B:
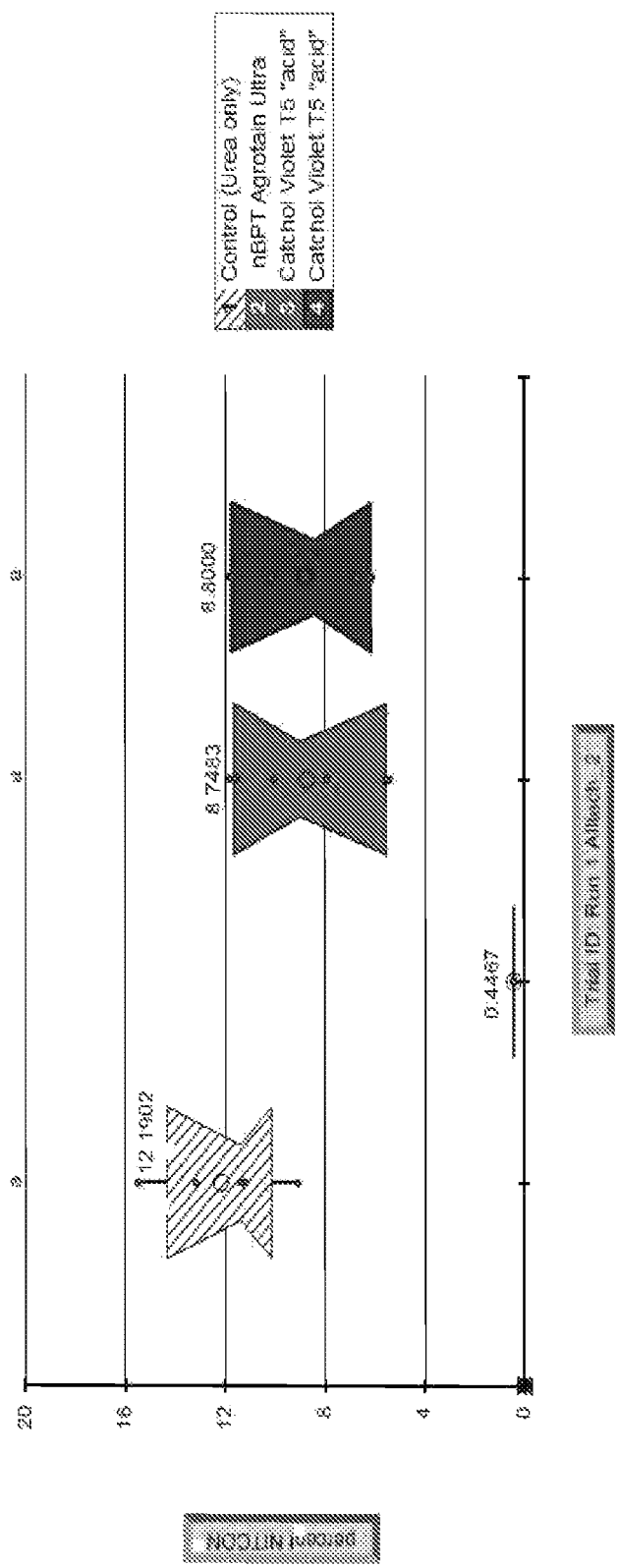

7.4—Three and Seven Day Results—FIGS. 4A and 4B

The three day (FIG. 4A) volatility and seven day (FIG. 4B) volatility results of solutions in the 50:50 water: urea solvent were examined.

Treatment 1: Untreated Urea, 50:50 in Deionized water.
Treatment 2: NBPT (Agrotain Ultra) in the 50:50 Urea water solution, 0.2% v/v.
Treatment 3: Catechol Violet and T5 Acid, at 0.125% v/v and 0.25% v/v, respectively.
Treatment 4: Catechol Violet and T5 Acid, each at 0.25% v/v in solution (as in previous runs; the amount of Catechol Violet was doubled from treatment 3 to treatment 4).

During the first three days of application, both catechol treatments with T5 acid very closely resemble the urease inhibition activity of NBPT. After 7 days, NBPT and the two catechol+T5 treatments continue to limit N-loss via volatilization when compared to the untreated urea solution.

That which is claimed:

1. A method of controlling enzyme-induced urea decomposition comprising the step of applying to soil a triarylmethane compound in a quantity sufficient to inhibit the decomposition of urea by the action of soil-borne urease inhibitor, wherein said triarylmethane compound comprises a central carbon atom C bonded with three individual aryl groups X, Y, and Z, where:

(1) the aryl group X has the structure

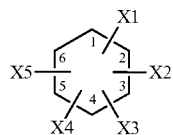

where the carbon atom C is bonded at position 1, and X1-X5, inclusive, are H or substituents bonded at any of the positions 2-6;

(2) the aryl group Y has the structure

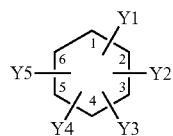

where the carbon atom C is bonded at position 1, and Y1-Y5, inclusive, are H or substituents bonded at any of the positions 2-6;

(3) the aryl group Z has the structure

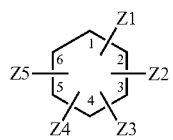

where the carbon atom C is bonded at position 1, and Z1-Z5, inclusive, are H or substituents bonded at any of the positions 2-6, where all of the selected substituents X1-X5, inclusive, Y1-Y5, inclusive, and Z1-Z5, inclusive, either belong to group I or group II, where the group I substituents are:

(A) at least one of X1-X5, inclusive, Y1-Y5, inclusive, and/or substituents Z1-Z5, inclusive, is a sulfonate group bonded at any of the positions 2-6 of the corresponding aryl ring(s) X, Y, and/or Z, said at least one sulfonate group comprising the structure (i)

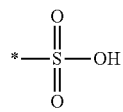 [SMILES: *S(=O)(=O)O]

or the structure (ii)

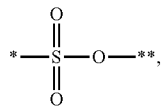

where "*" represents the bonding of the sulfonate group to the corresponding X, Y, or Z aryl group, and "**" represents the bonding of the sulfonate group to another atom of the triarylmethane compound;

(B) at least two of X1-X5, inclusive, Y1-Y5, inclusive, and/or Z1-Z5, inclusive, are substituents comprising an oxygen atom bonded to the corresponding aryl ring(s) X, Y, and/or Z, and selected from the group consisting of O and OH, with the proviso that no more than two such oxygen atoms are present in any of the X, Y, and Z aryl groups; and (C) X1-X5, inclusive, Y1-Y5, inclusive, and/or Z1-Z5, inclusive, which are not the substituents of paragraphs (A) and (B), are all H, the group II substituents are:

(D) at least one nitrogen substituent is bonded to at least one of the aryl groups X, Y, and/or Z, where the nitrogen substituent is selected from the group consisting of

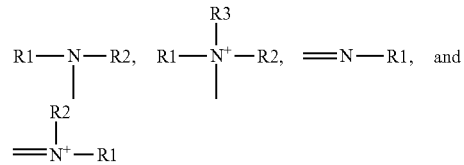

where R1, R2, and R3 are independently selected from the group consisting of H, $CH_3$, and $C_2H_5$, and (E) the remainder of the substituents X1-X5, Y1-Y5, and Z1-Z5 are independently selected from the group consisting of H, $CH_3$, and $C_2H_5$.

2. The method of claim 1, wherein said triarylmethane compound with group I substituents has one or more of the following:

(a) only a single sulfonate group;
(b) said central carbon atom C being the only carbon atom of the triarylmethane compound not a part of an aryl ring.

3. The method of claim 2, wherein said sulfonate group is bonded to said X, Y, or Z aryl ring at a position ortho to the bond between the corresponding ring and said central carbon atom C.

4. The method of claim 1, wherein said triarylmethane compound with group I substituents has at least two of said aryl rings X, Y, and Z with two substituents, each of which have an oxygen atom bonded to the corresponding aryl rings, and wherein:

(a) at least one aryl ring of said two aryl rings has two hydroxyl substituents; or
(b) each of said two aryl rings has two hydroxyl substituents.

5. The method of claim 1, wherein said triarylmethane compound with group I substituents has at least two of said aryl rings X, Y, and Z with two substituents, each of which have an oxygen atom bonded to the corresponding aryl rings, and wherein:

(a) at least one aryl ring of said two aryl rings has one hydroxyl substituent and one oxygen substituent; or (b) each of said two aryl rings has one hydroxyl substituent and one oxygen substituent.

6. The method of claim 4, wherein each of said two aryl rings has two hydroxyl substituents, wherein said two hydroxyl substituents are positioned ortho to each other.

7. The method of claim 1, wherein said triarylmethane compound is methyl violet or 3,3',4-trihydroxysuchsone-2"-sulfonic acid.

8. The method of claim 1, wherein said triarylmethane compound has the structure

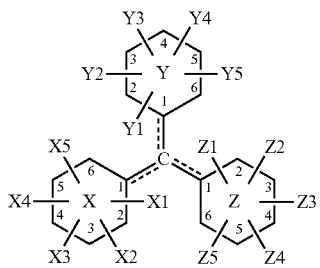

where one of the bonds between the central carbon atom C and one of the aryl rings X, Y, or Z is a double bond, and the remaining two bonds are single bonds, said at least one sulfonate group comprising either the structure (A)(i) when the triarylmethane compound is a Group I compound;
or comprising the structure (A)(ii), with the "**" representing the bonding of the S—O oxygen to said central carbon atom C.

9. The method of claim 1, further including the step of applying said triarylmethane compound in conjunction with a urea-containing fertilizer, wherein said triarylmethane compound and urea-containing fertilizer are applied either separately or simultaneously.

10. The method of claim 9, wherein said triarylmethane compound is contacted with said urea-containing fertilizer prior to said application thereof.

11. The method of claim 1, wherein said triarylmethane compound is in combination with a polyanionic tetrapolymer comprising sulfonate repeat units.

12. The method of claim 11, wherein said tetrapolymer comprises maleic, itaconic, and sulfonate repeat units; and/or said tetrapolymer is present at a level to increase the control of enzyme-induced urea decomposition, as compared with use of said triarylmethane compound alone.

13. The method of claim 10, wherein said urea-containing fertilizer is a liquid fertilizer, said triarylmethane compound being mixed with the liquid fertilizer.

14. The method of claim 10, wherein said urea-containing fertilizer is a solid fertilizer, said triarylmethane compound being coated with, mixed with, impregnated with, or in contact with said fertilizer.

15. The method of claim 1 comprising one or more of the following:
(a) said method decreasing urease activity by at least about 50%;
(b) said method decreasing nitrogen volatilization;
(c) said method decreasing nitrogen volatilization by at least about 25% when compared to a control;
(d) said method decreasing nitrogen volatilization after about 3 days;
(e) said method further comprising the step of applying poly(styrene sulfonate).

16. The method of claim 1, wherein said method further comprises application of a composition comprising a triarylmethane compound and a synergist, wherein said triarylmethane compound comprises a central carbon atom C bonded with three individual aryl groups X, Y, and Z, where:
(1) the aryl group X has the structure

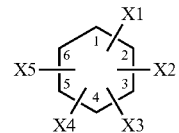

where the carbon atom C is bonded at position 1, and X1-X5, inclusive, are H or substituents bonded at any of the positions 2-6;
(2) the aryl group Y has the structure

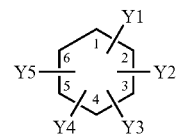

where the carbon atom C is bonded at position 1, and Y1-Y5, inclusive, are H or substituents bonded at any of the positions 2-6;
(3) the aryl group Z has the structure

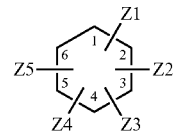

where the carbon atom C is bonded at position 1, and Z1-Z5, inclusive, are H or substituents bonded at any of the positions 2-6,
where all of the selected substituents X1-X5, inclusive, Y1-Y5, inclusive, and Z1-Z5, inclusive, belong to either group I or group II,
where the group I substituents are:
(A) at least one of X1-X5, inclusive, Y1-Y5, inclusive, and/or Z1-Z5, inclusive, is a sulfonate group bonded at any of the positions 2-6 of the corresponding aryl ring(s) X, Y, and/or Z, said at least one sulfonate group comprising the structure (i)

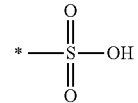

or the structure (ii)

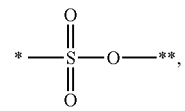

where "*" represents the bonding of the sulfonate group to the corresponding X, Y, or Z aryl group, and "**" represents the bonding of the sulfonate group to another atom of the triarylmethane compound;

(B) at least two of X1-X5, inclusive, Y1-Y5, inclusive, and/or Z1-Z5, inclusive, are substituents comprising an oxygen atom bonded to the corresponding aryl ring(s) X, Y, and/or Z, and selected from the group consisting of O and OH, with the proviso that no more than two such oxygen atoms are present in any of the X, Y, and Z aryl groups; and (C) X1-X5, inclusive, Y1-Y5, inclusive, and/or Z1-Z5, inclusive, which are not the substituents of paragraphs (A) and (B), are all H, the group II substituents are:

(D) at least one nitrogen substituent is bonded to at least one of the aryl groups X, Y, and/or Z, where the nitrogen substituent is selected from the group consisting of

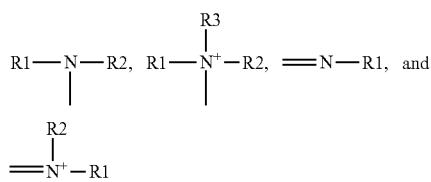

where R1, R2, and R3 are independently selected from the group consisting of H, CH$_3$, and C$_2$H$_5$, and (E) the remainder of the substituents X1-X5, Y1-Y5, and Z1-Z5 are independently selected from the group consisting of H, CH$_3$, and C$_2$H$_5$, said synergist comprising a polyanionic polymer comprising sulfonate repeat units, wherein one or more of the following applies:

(a) said composition comprises a triarylmethane compound in a range from about 0.01% to about 2.0%;

(b) said triarylmethane compound being 3,3',4-trihydroxysuchsone-2"-sulfonic acid;

(c) said composition comprising a tetrapolymer in a range from about 0.01% to about 2.0%;

(d) said composition comprising a T5 polymer.

17. A fertilizer product comprising a urea-containing fertilizer in contact with a triarylmethane compound comprising a central carbon atom C bonded with three individual aryl groups X, Y, and Z, where:

(1) the aryl group X has the structure

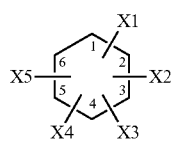

where the carbon atom C is bonded at position 1, and X1-X5, inclusive, are H or substituents bonded at any of the positions 2-6;

(2) the aryl group Y has the structure

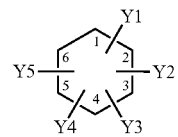

where the carbon atom C is bonded at position 1, and Y1-Y5, inclusive, are H or substituents bonded at any of the positions 2-6;

(3) the aryl group Z has the structure

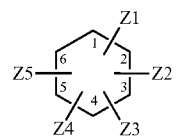

where the carbon atom C is bonded at position 1, and Z1-Z5, inclusive, are H or substituents bonded at any of the positions 2-6, where all of the selected substituents X2-X6, inclusive, Y2-Y6, inclusive, and Z2-Z6, inclusive, either belong to group I or group II, where the group I substituents are:

(A) at least one of X1-X5, inclusive, Y1-Y5, inclusive, and/or Z1-Z5, inclusive, is a sulfonate group bonded at any of the positions 2-6 of the corresponding aryl ring(s) X, Y, and/or Z, said at least one sulfonate group comprising the structure (i)

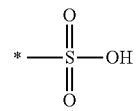

or the structure (ii)

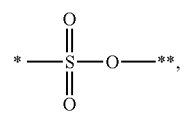

where "*" represents the bonding of the sulfonate group to the corresponding X, Y, or Z aryl group, and "**" represents the bonding of the sulfonate group to another atom of the triarylmethane compound;

(B) at least two of X1-X5, inclusive, Y1-Y5, inclusive, and/or Z1-Z5, inclusive, are substituents comprising an oxygen atom bonded to the corresponding aryl ring(s) X, Y, and/or Z, and selected from the group consisting of O and OH, with the proviso that no more than two such oxygen atoms are present in any of the X, Y, and Z aryl groups; and (C) X1-X5, inclusive, Y1-Y5, inclusive, and/or Z1-Z5, inclusive, which are not the substituents of paragraphs (A) and (B), are all H, the group II substituents are:

(D) at least one nitrogen substituent is bonded to at least one of the aryl groups X, Y, and/or Z, where the nitrogen substituent is selected from the group consisting of

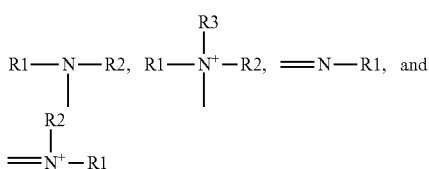

where R1, R2, and R3 are independently selected from the group consisting of H, CH$_3$, and C$_2$H$_5$, and
(E) the remainder of the substituents X1-X5, Y1-Y5, and Z1-Z5 are independently selected from the group consisting of H, CH$_3$, and C$_2$H$_5$.

18. The fertilizer product of claim 17 comprising one or more of the following:
    (a) a weight ratio of polyanionic tetrapolymer to triarylmethane compound from about 1:4 to about 4:1;
    (b) the color of said fertilizer product being pH-dependent;
    (c) said fertilizer product decreasing urease activity by at least about 50%;
    (d) said fertilizer product further comprising poly(styrene sulfonate).

19. A composition comprising a triarylmethane compound and a synergist, wherein said triarylmethane compound comprises a central carbon atom C bonded with three individual aryl groups X, Y, and Z, where:
    (1) the aryl group X has the structure

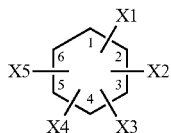

where the carbon atom C is bonded at position 1, and X1-X5, inclusive, are H or substituents bonded at any of the positions 2-6;
    (2) the aryl group Y has the structure

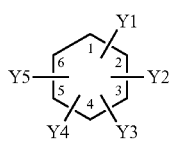

where the carbon atom C is bonded at position 1, and Y1-Y5, inclusive, are H or substituents bonded at any of the positions 2-6;
    (3) the aryl group Z has the structure

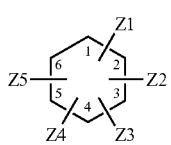

where the carbon atom C is bonded at position 1, and Z1-Z5, inclusive, are H or substituents bonded at any of the positions 2-6, where all of the selected substituents X1-X5, inclusive, Y1-Y5, inclusive, and Z1-Z5, inclusive, belong either to group I or group II,
where the group I substituents are:
    (A) at least one of X1-X5, inclusive, Y1-Y5, inclusive, and/or Z1-Z5, inclusive, is a sulfonate group bonded at any of the positions 2-6 of the corresponding aryl ring(s) X, Y, and/or Z, said at least one sulfonate group comprising the structure (i)

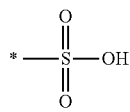

or the structure (ii)

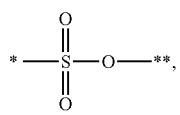

where "*" represents the bonding of the sulfonate group to the corresponding X, Y, or Z aryl group, and "**" represents the bonding of the sulfonate group to another atom of the triarylmethane compound;
    (B) at least two of X1-X5, inclusive, Y1-Y5, inclusive, and/or Z1-Z5, inclusive, are substituents comprising an oxygen atom bonded to the corresponding aryl ring(s) X, Y, and/or Z, and selected from the group consisting of O and OH, with the proviso that no more than two such oxygen atoms are present in any of the X, Y, and Z aryl groups; and
    (C) X1-X5, inclusive, Y1-Y5, inclusive, and/or Z1-Z5, inclusive, which are not the substituents of paragraphs (A) and (B), are all H,
the group II substituents are:
    (D) at least one nitrogen substituent is bonded to at least one of the aryl groups X, Y, and/or Z, where the nitrogen substituent is selected from the group consisting of

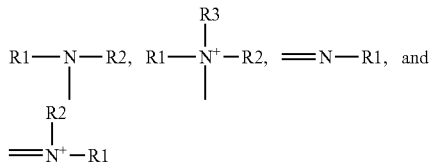

where R1, R2, and R3 are independently selected from the group consisting of H, CH$_3$, and C$_2$H$_5$, and
    (E) the remainder of the substituents X1-X5, Y1-Y5, and Z1-Z5 are independently selected from the group consisting of H, CH$_3$, and C$_2$H$_5$,
said synergist comprising a polyanionic polymer comprising sulfonate repeat units.

20. The composition of claim 19 comprising one or more of the following:
    (a) a weight ratio of synergist to triarylmethane compound from about 1:4 to about 4:1;
    (b) the color of said composition being pH-dependent;

(c) said composition decreasing urease activity by at least about 50%;
(d) said composition further comprising a solvent or carrier;
(e) said composition further comprising water as a solvent;
(f) said composition further comprising poly(styrene sulfonate).

* * * * *